(12) United States Patent
Bhandari et al.

(10) Patent No.: US 11,700,594 B2
(45) Date of Patent: Jul. 11, 2023

(54) RESOURCE ISOLATION IN WIRELESS COMMUNICATIONS SYSTEMS

(71) Applicant: AltioStar Networks, Inc., Tewksbury, MA (US)

(72) Inventors: Anil Kumar Bhandari, Andover, MA (US); Sridhar Bhaskaran, Bangalore (IN)

(73) Assignee: AltioStar Networks, Inc., Tewksbury, MA (US)

( * ) Notice: Subject to any disclaimer, the term of this patent is extended or adjusted under 35 U.S.C. 154(b) by 74 days.

(21) Appl. No.: 16/796,620

(22) Filed: Feb. 20, 2020

(65) Prior Publication Data

US 2021/0266870 A1 Aug. 26, 2021

(51) Int. Cl.
*H04W 72/04* (2023.01)
*H04W 72/00* (2023.01)
*H04W 48/08* (2009.01)

(52) U.S. Cl.
CPC .......... *H04W 72/04* (2013.01); *H04W 48/08* (2013.01); *H04W 72/00* (2013.01)

(58) Field of Classification Search
CPC ..... H04W 16/02; H04W 48/08; H04W 72/00; H04W 72/10
See application file for complete search history.

(56) References Cited

U.S. PATENT DOCUMENTS 8,520,680 B1\* 8/2013 Doshi ................. H04L 12/4662
370/392
10,965,591 B2\* 3/2021 Scott ..................... H04B 7/2041

2017/0118185 A1\* 4/2017 Chastain ............. H04L 63/0869
2018/0317148 A1\* 11/2018 Jin ..................... H04W 36/0033
2019/0174554 A1\* 6/2019 Deenoo ................ H04L 5/0048
2019/0327663 A1\* 10/2019 Wirth ..................... H04W 16/02
2020/0187085 A1\* 6/2020 Jagannatha ........... H04W 72/10

(Continued)

FOREIGN PATENT DOCUMENTS

WO WO-2016192639 A1 12/2016
WO WO-2017/168112 A1 10/2017

OTHER PUBLICATIONS

International Search Report and Written Opinion, dated May 28, 2021—International Patent Applicaiton No. PCT/US2021/018483, filed Feb. 18, 2021.

(Continued)

*Primary Examiner* — Raj Jain
(74) *Attorney, Agent, or Firm* — Mintz Levin Cohn Ferris Glovsky and Popeo, P.C.

(57) ABSTRACT

A method, an apparatus, a system, and a computer program product for resource isolation in wireless communication systems. A communication network in a plurality of communication networks of a wireless communications system is identified. Each communication network in the plurality of communication networks has one or more communication components logically isolated from one or more communication components of another communication network in the plurality of communication networks. The identified communication network is selected for transmission of data associated with a user device. Data associated with the user device is transmitted using the identified communication network.

20 Claims, 26 Drawing Sheets

(56) References Cited

U.S. PATENT DOCUMENTS

2020/0367109 A1* 11/2020 Chen ............... H04W 28/18
2021/0112565 A1* 4/2021 Bhaskaran ........... H04W 24/08
2021/0266870 A1* 8/2021 Bhandari ............. H04W 72/04

OTHER PUBLICATIONS

CATT: "Analysis on function split between CU and DU", 3GPP Draft; R3-170990 Analysis on Function Split Between Cu and Du, 3rd Generation Partnership Project (3GPP), Mobile Competence Centre; 650, Route Des Lucioles; F-06921 Sophia-Antipolis Cedex; FRA vol. RAN WG3, No. Spokane, Washington, USA; Apr. 3, 2017-Apr. 7, 2017 Apr. 3, 2017 (Apr. 3, 2017), XP051245717, Retrieved from the Internet: URL:http://www.3gpp.org/ftp/Meetings_3GPP_SYNC/RAN3/Docs/.

Huawei et al., "Support of isolated slice usage in the UE", 3GPP Draft; S2-184595 WAS 3926—Support for Slice Isolation, 3rd Generation Partnership Project (3GPP), Mobile Competence Centre; 650, Route Des Lucioles; F-06921 Sophia-Antipolis Cedex; France vol. SA WG2, No. Sanya, China; Apr. 16, 2018-Apr. 20, 2018 Apr. 20, 2018 (Apr. 20, 2018), XP051433134, Retrieved from the Internet: URL:http://www.3gpp.org/ftp/Meetings%5F3GPP%5FSYNC/SA2/Docs/.

"3rd Generation Partnership Project; Technical Specification Group Radio Access Network; Study on New Radio Access Technology; Radio Access Architecture and Interfaces (Release 14)", 3GPP Draft; 38801-200, 3rd Generation Partnership Project (3GPP), Mobile Competence Centre ; 650, Route Des Lucioles ; F-06921 Sophia-Antipolis Cedex; France Mar. 18, 2018 (Mar. 18, 2018).

* cited by examiner

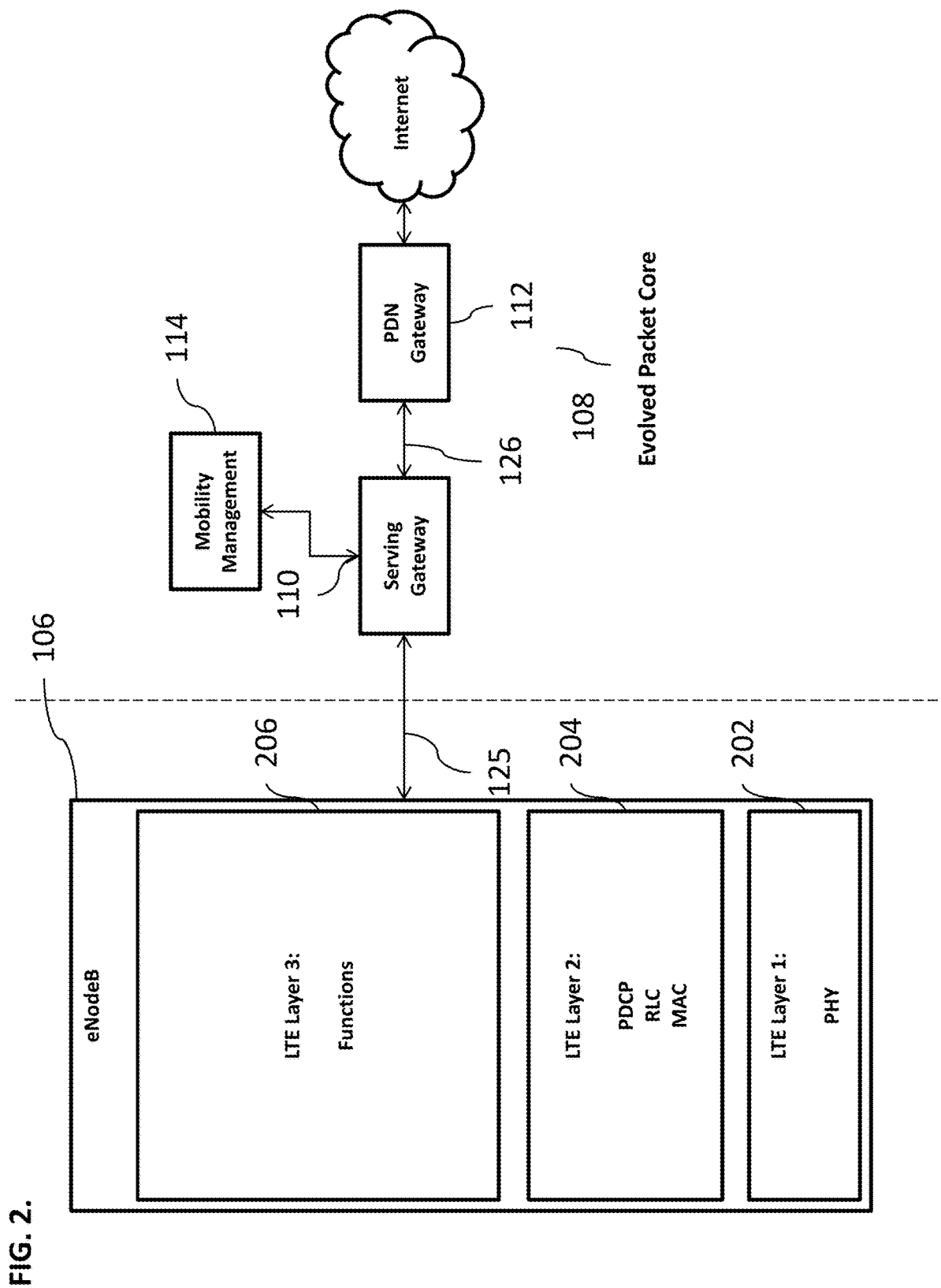

RESOURCE ISOLATION IN WIRELESS COMMUNICATIONS SYSTEMS

TECHNICAL FIELD

In some implementations, the current subject matter relates to telecommunications systems, and in particular, to resource isolation in wireless communications systems, such as, for example, 5G New Radio ("NR") which may include a lower layer split architecture.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G LTE standard is currently being developed. LTE is based on the GSM/EDGE and UMTS/HSPA digital cellular technologies and allows for increasing capacity and speed by using a different radio interface together with core network improvements.

5G NR networks implement various radio resource sharing deployment scenarios, among which are multi-operator radio access network (MORAN) and multi-operator core network (MOCN). Some parts of multi-operator shared networks have been described in a 3GPP standard (e.g., TS 32.130, TS 23.251, TS23.501). However, many aspects of these multi-operator shared networks, including resource partitioning, resource isolation, etc. are not described and may be dependent on various network implementations.

SUMMARY

In some implementations, the current subject matter relates to a computer implemented method for resource isolation in wireless communication systems. The method may include identifying a communication network in a plurality of communication networks of a wireless communications system. Each communication network in the plurality of communication networks may have one or more communication components logically isolated from one or more communication components of another communication network in the plurality of communication networks. The method may further include selecting the identified communication network for transmission of data associated with a user device, and transmitting, using the identified communication network, data associated with the user device.

In some implementations, the current subject matter can include one or more of the following optional features. The method can further include determining, based on the identified communication network, at least one communication component of the communication network for isolation. In some implementations, the plurality of communications networks can include at least one of the following: a multi-operator radio access network (MORAN), a multi-operator core network (MOCN), a radio access network, a virtual radio access network, a core network, and any combination thereof. Further, the method can include selecting one or more distributed units (DU) for transmission of data based on at least one of the following: one or more component carriers, one or more bandwidth parts, one or more physical resource block ranges, and any combination thereof.

In some implementations, at least one of the identifying, the selecting and the transmitting can be performed by a base station. The base station can include at least one of the following communication components: one or more remote radio units (RUs), one or more centralized units (CUs), one or more distributed units (DUs), one or more control plane portions of the one or more centralized units (CU-CPs), one or more user plane portions of the one or more centralized units (CU-UPs), one or more access and mobility functions (AMFs), one or more user plane functions (UPFs), and one or more session management functions (SMFs). In some implementations, at least one of one or more CU-UPs, one or more AMFs, one or more UPFs, and one or more SMFs of one communication network in the plurality of communication networks are logically isolated from at least one of one or more CU-UPs, one or more AMFs, one or more UPFs, and one or more SMFs of another communication network in the plurality of communication networks. One or more remote RUs, one or more DUs, and one or more CU-CPs can be common to all communication networks in the plurality of communication networks. The data associated with the user device can then be transmitted using one or more communication networks.

In some implementations, the DUs, CU-UPs, AMFs, UPFs, and SMFs of different PLMNs can be logically isolated of all communication networks in the plurality of communication networks for transmission of data associated with the user device.

In some implementations, the RUs, DUs, CU-UPs, CU-CPs, AMFs, UPFs, SMFs of different PLMNs can be logically isolated of all communication networks in the plurality of communication networks for transmission of data associated with the user device.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 2 illustrates further detail of an evolved Node B shown in FIGS. 1a-d;

DETAILED DESCRIPTION

The current subject matter can provide for systems and methods that can be implemented in lower layer split architecture for wireless communications systems. Such systems can include various wireless communications systems, including 5G New Radio communications systems, long term evolution communication systems, etc.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
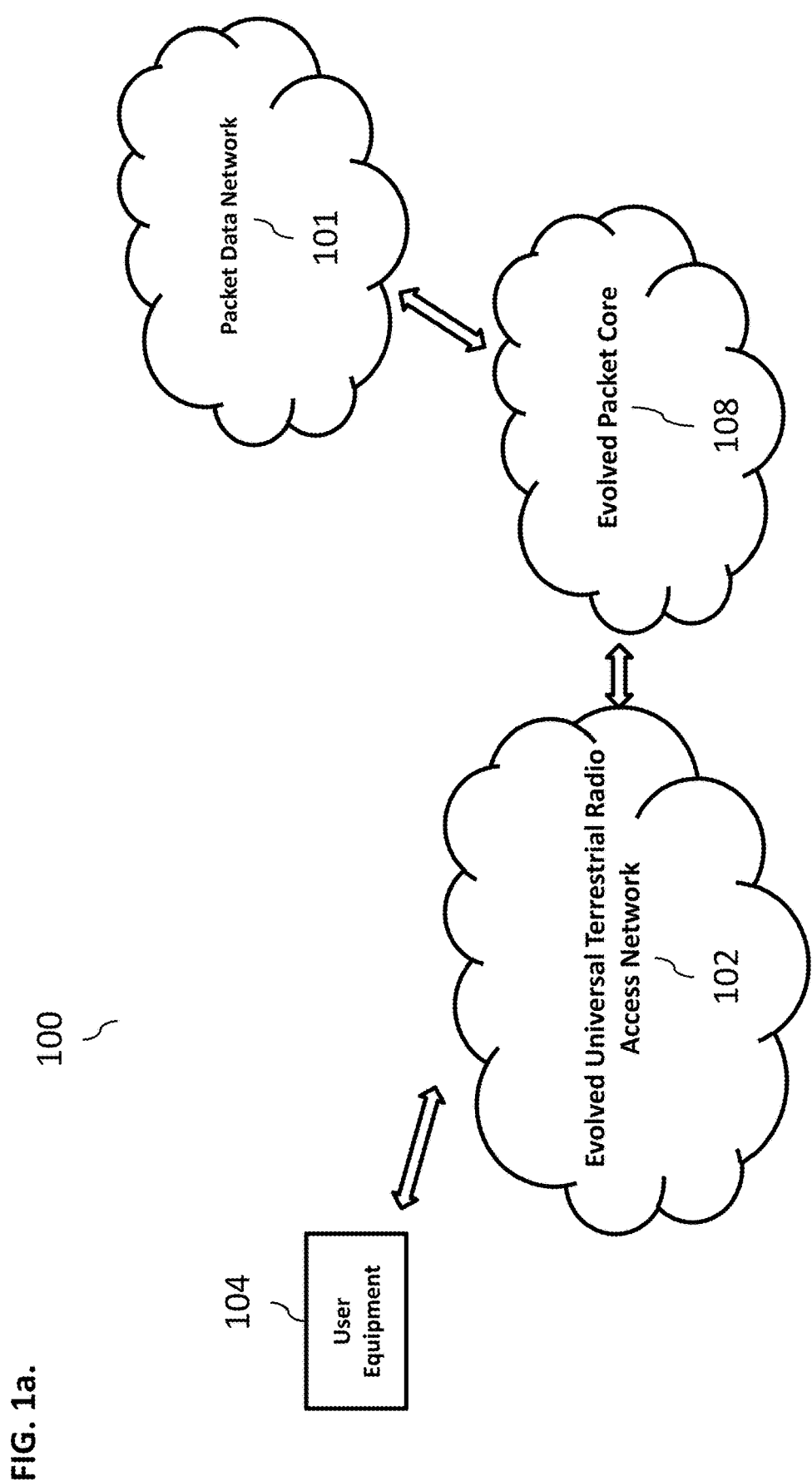
FIG. 1a illustrates an exemplary conventional long term evolution ("LTE") communications system.
Figure 1B:
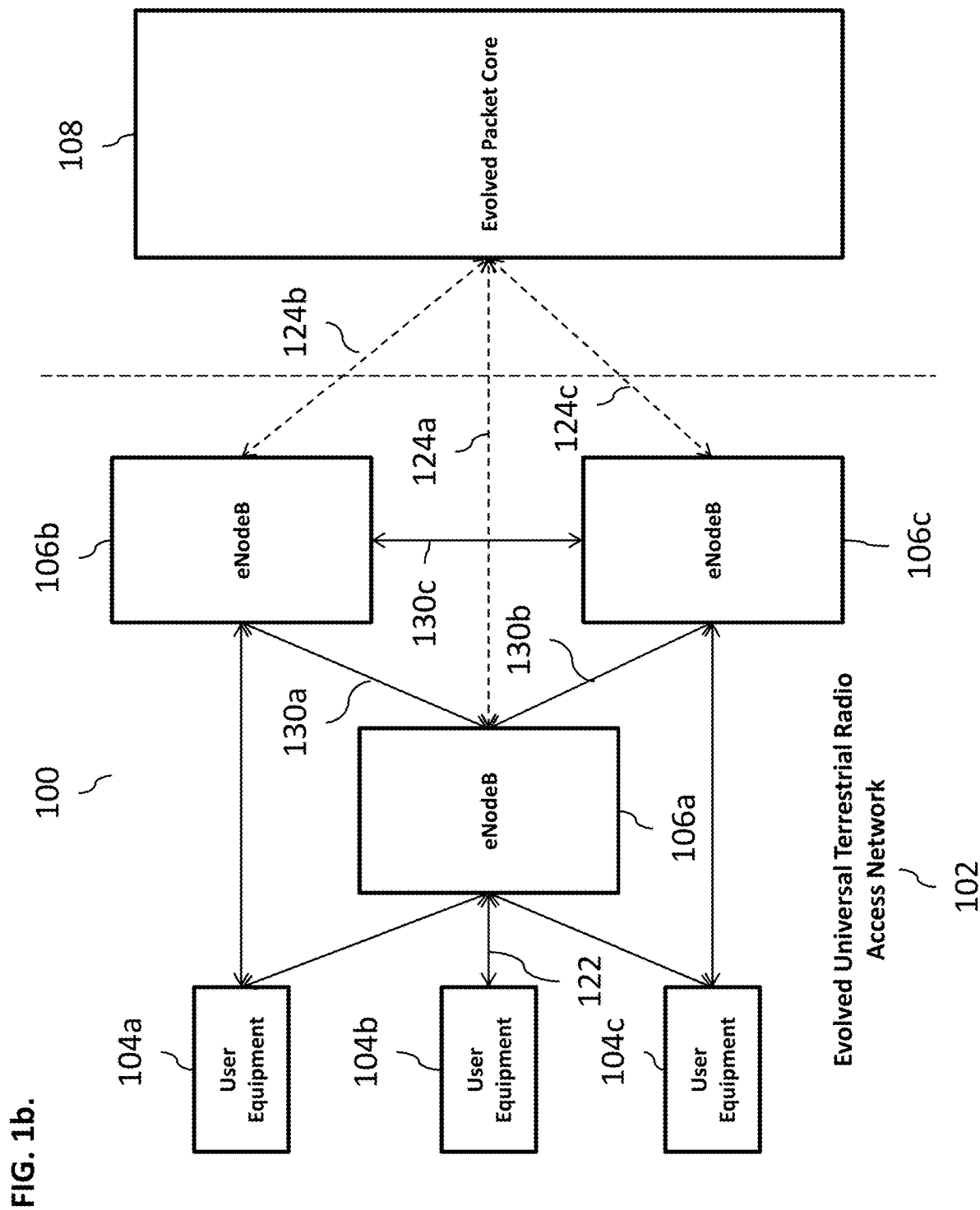

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
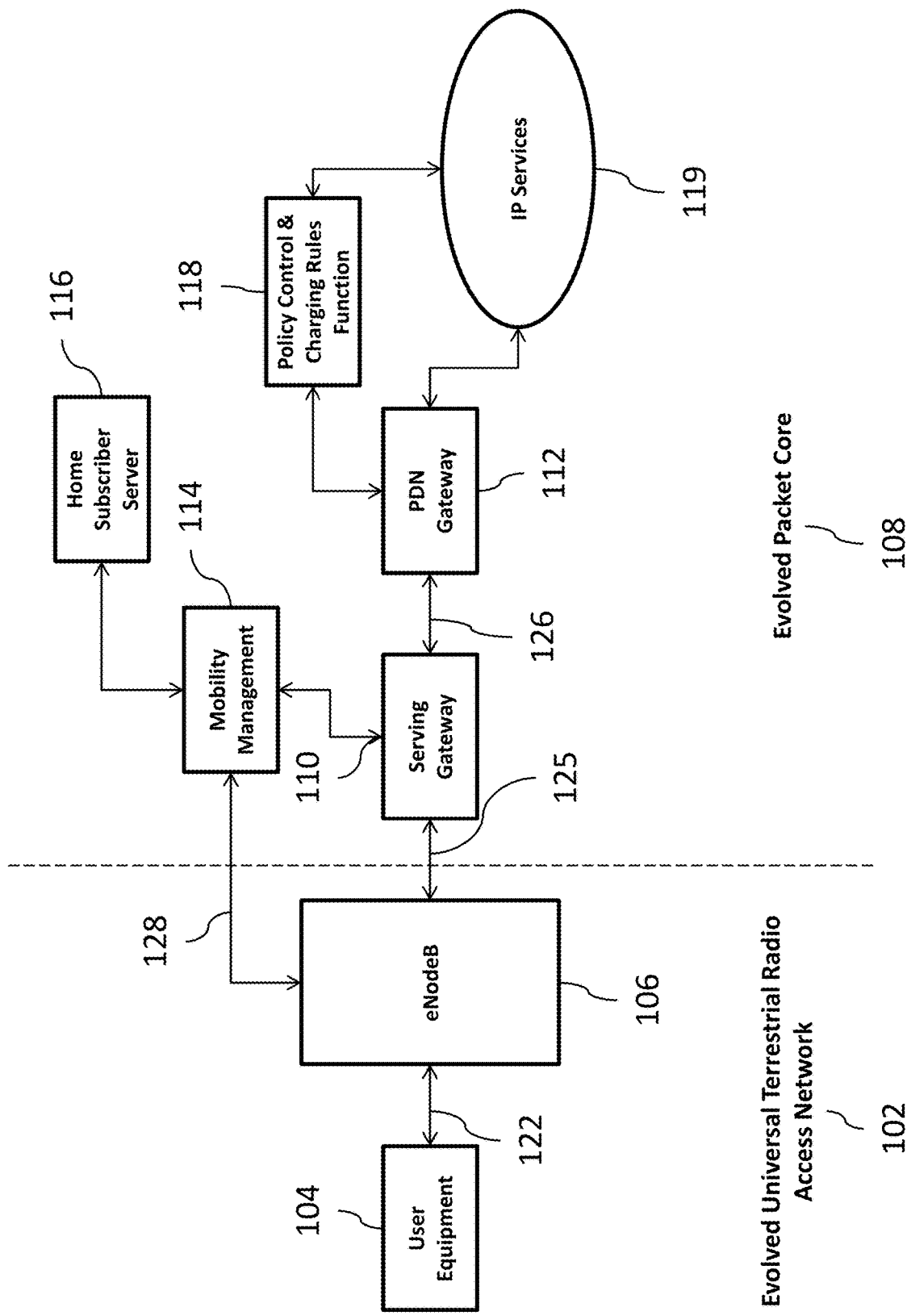

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
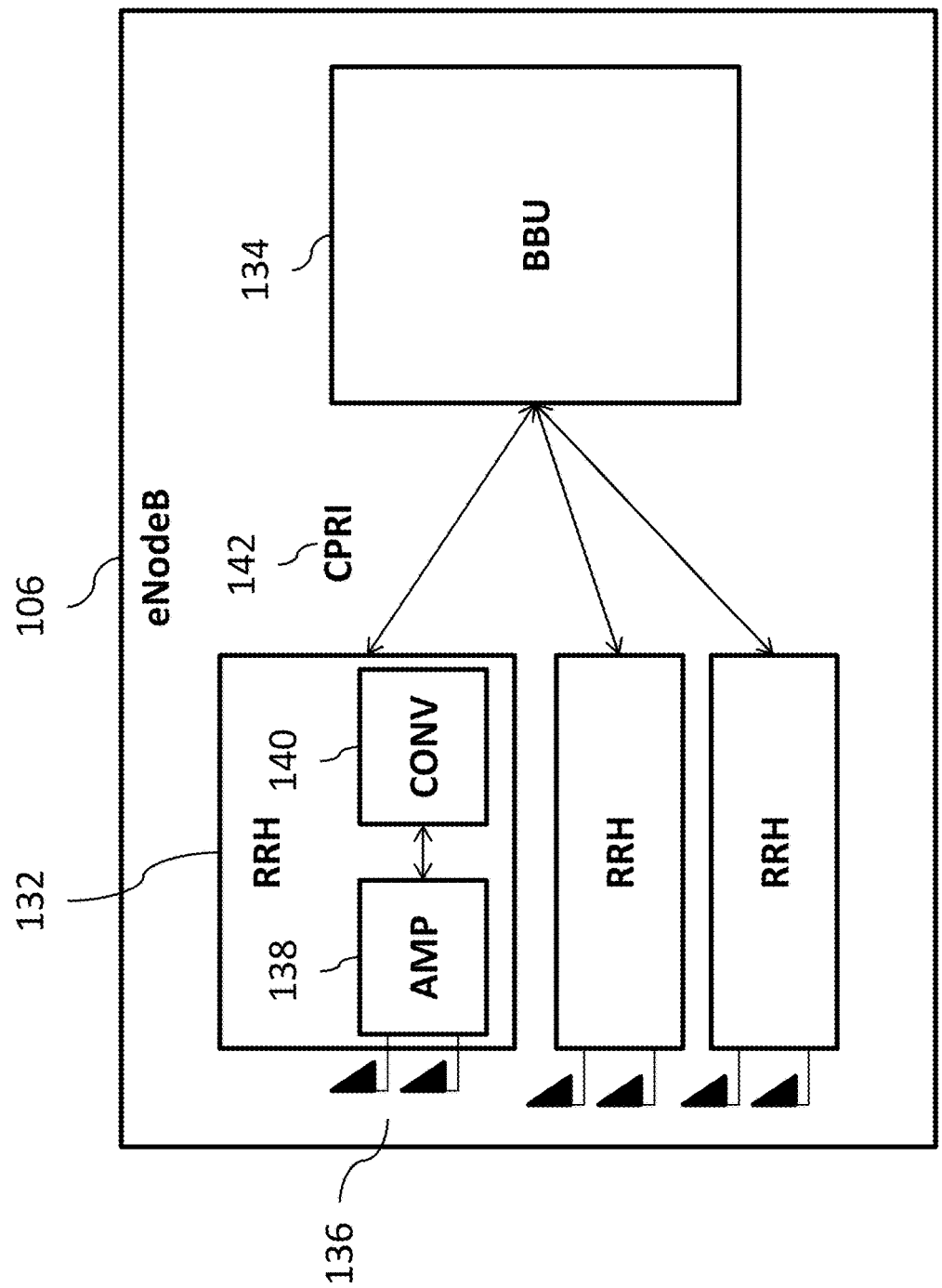

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when not Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
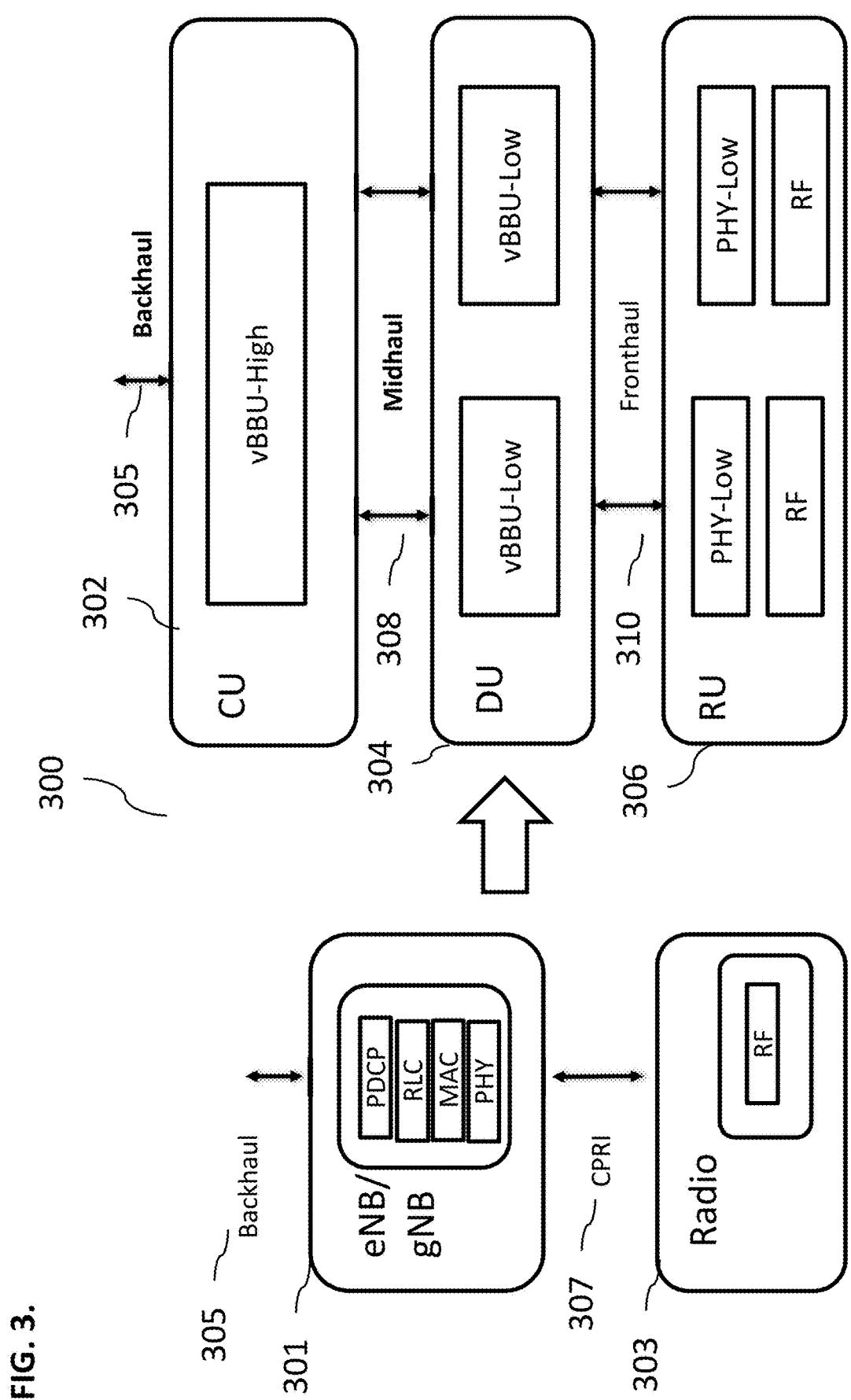
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 308. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul interface. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
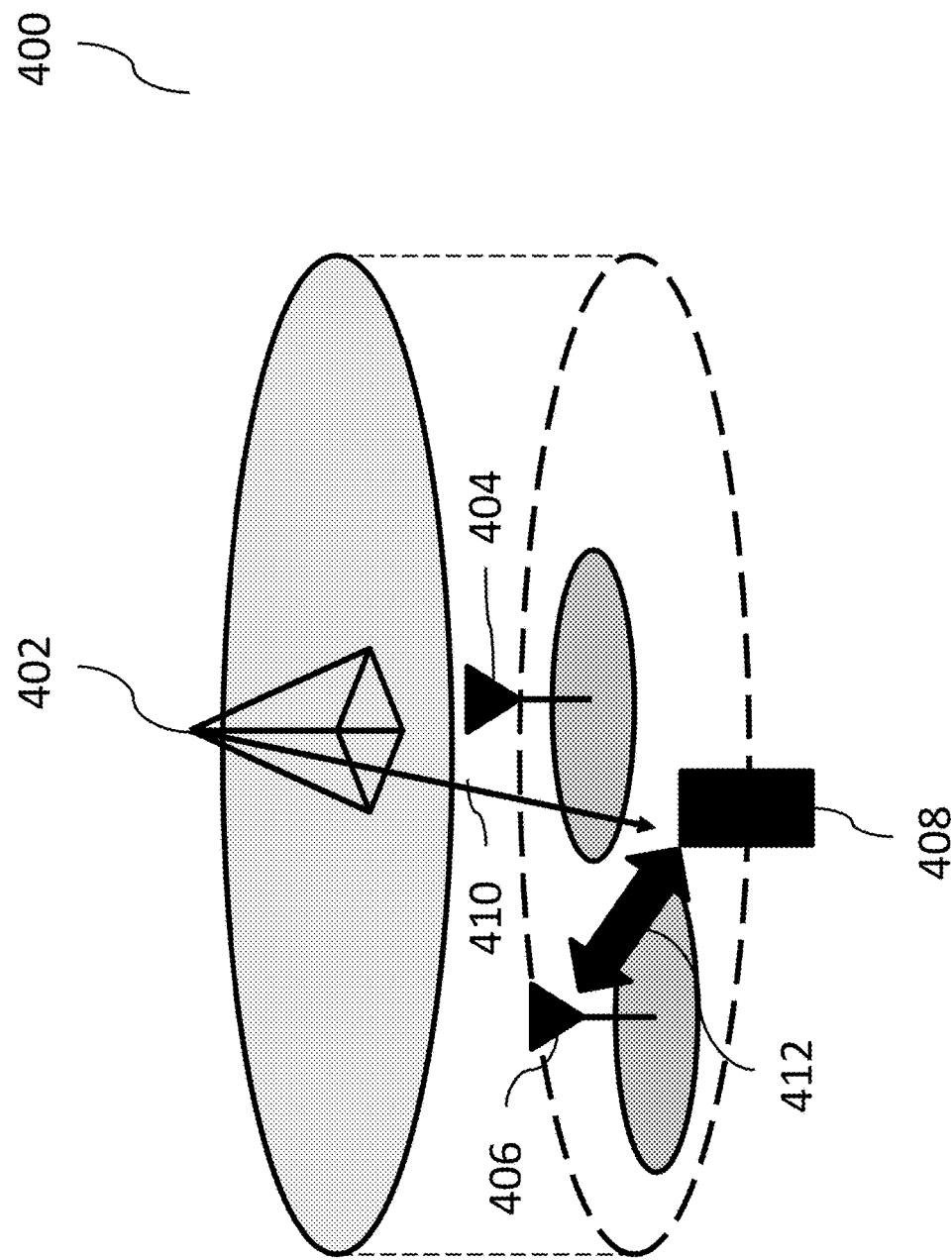
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 402, 404 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE PUCCH and NR PUCCH can be transmitted on the same frequency.

III. Network Slicing 5G network slicing refers to a network architecture that allows multiplexing of virtualized and independent logical networks on the same physical network infrastructure, where each network slice is an isolated end-to-end network that is configured to serve different requirements that may be requested by a particular application. There may be some network functions in the control plane that may be common to more than one network slice. The network slicing technology implements various concepts of software-defined networking (SDN) and network function virtualization (NFV) allowing implementation of flexible and scalable network slices on top of a common network infrastructure. Each network slice can be administered by the same or different mobile virtual network operators (MVNO), whereby a MVNO can autonomously deploy multiple network slices that can be customized to various applications.

Figure 5:
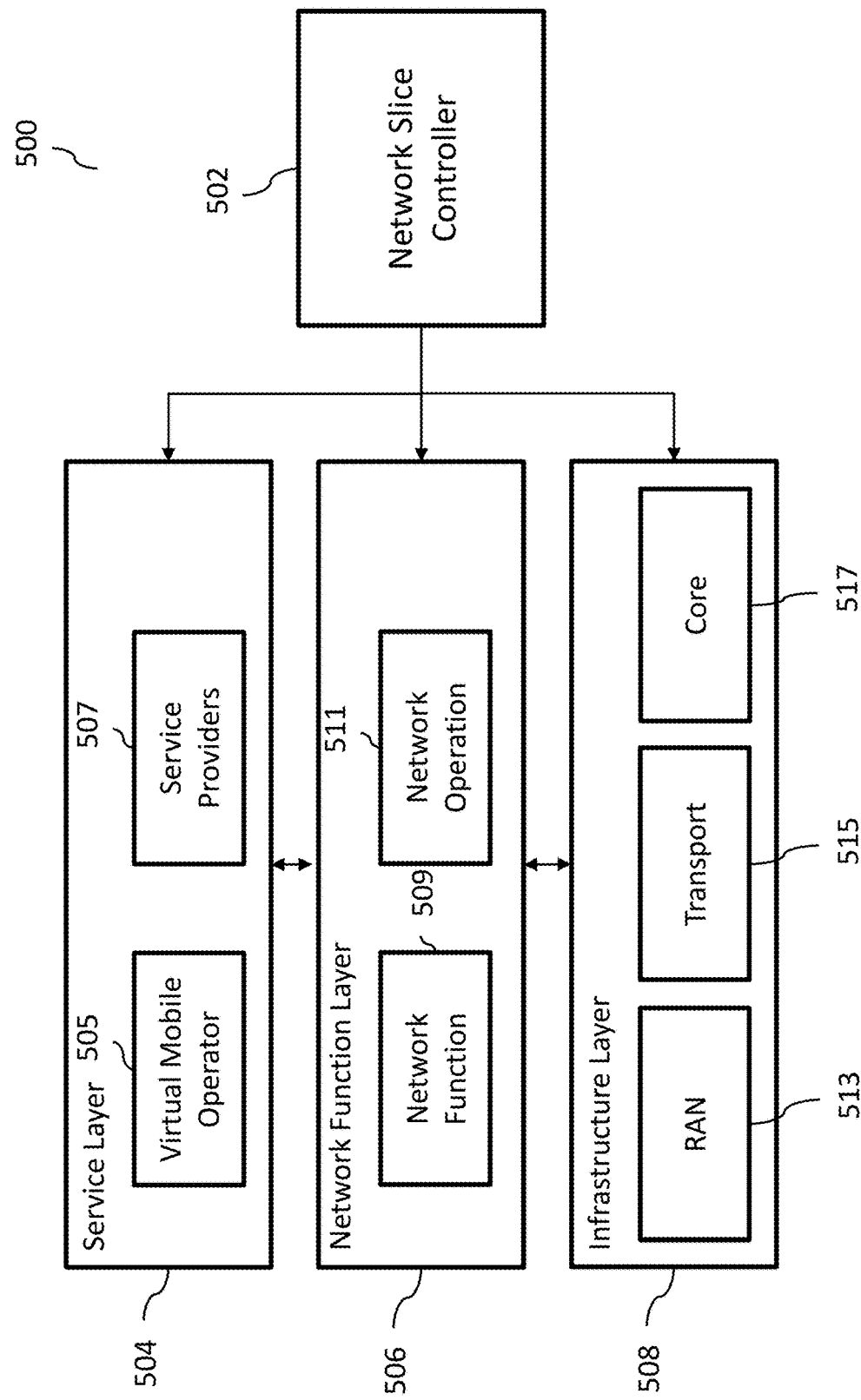
FIG. 5 illustrates an exemplary network slice architecture.

FIG. 5 illustrates an exemplary network slice architecture 500. The architecture 500 can include a network slice controller 502, a service layer 504, a network function layer 506, and an infrastructure layer 508. The network slice controller 502 interfaces with various functionalities performed by layers 504-508 to manage requests by each slice. The controller 502 coordinates communications between layers 504-508 to provide end-to-end service management (i.e., maps various service instances (SLA requirements) to network functions satisfying service constraints), virtual resources definition (i.e., virtualizes physical network resources to manage resources for allocation of network functions), and slice life-cycle management (i.e., monitors slice performance across all the three layers 504-508 for dynamic reconfiguration of each slice to accommodate changes in SLA requirements).

The service layer 504 interfaces with one or more mobile virtual network operator (MVNO) 505 and one or more service providers 507. The MVNOs and providers 507 can share a physical network, where each service is represented as a service instance that includes all network characteristics as service level (SLA) requirements. The network function layer 506 creates each network slice according to service instance requests coming from layer 504. It includes various network functions that may be placed over virtual network infrastructure and coupled together to create an end-to-end network slice instance in accordance with network characteristics requested by the service. The infrastructure layer 508 is the actual physical network topology upon which every network slice is multiplexed and provides physical network resources to host network functions of each slice.

While network slicing is a core feature of the 5G communication networks and selection of network functions and routing of data via isolated networks is based on the slice's ID, the end-to-end slicing aspects for the radio access network and resource isolation for each slice have not been defined yet and are up to specific implementations. Moreover, current standards define core network selection and routing towards core network based on the network slice, however, resource isolation and management of radio level resources are also not defined in existing systems. The current subject matter provides a solution to these issues by providing multiple deployment methods and system aspects for achieving resource isolation in the RAN.

Network slice instances can be allocated/de-allocated by network operators in accordance with various 3GPP standards that also specify profiles for slices (i.e., SliceProfile) as well as properties for each slice. Some of the properties can include performance requirements for a slice (perfReq) attribute that can be categorized based on whether the slice/service type (SST) is enhanced mobile broadband (eMBB), ultra-reliable low-latency communication (URLLC), massive machine type communication (mMTC), etc. The following data model, as specified in 3GPP standard, may be used for defining requirements for a slice:

```
grouping perfReq {
    choice SST {
        case eMBB {
            leaf expDataRateDL {type uint16;}
            leaf expDataRateU {type uint16;}
            leaf areaTrafficCapDL {type uint16;}
            leaf areaTrafficCapUL {type uint16;}
            leaf user Density {type uint16;}
            leaf activityFactor {type uint16;}
            leaf uESpeed {type uint16;}
            leaf coverage {type string;}
        }
        case uRLLC {
            leaf e2eLatency {type uint16;}
            leaf jitter {type uint16;}
            leaf survivalTime {type uint16;}
            leaf cSAvailability {
                type decimal64 {
                    fraction-digits 4;
                    range 1..99.9999;
                }
            }
            leaf reliability {
                type decimal64 {
                    fraction-digits 4;
                    range 1..99.9999;
                }
            }
            leaf expDataRate {type uint16;}
            leaf payloadSize {type string;}
            leaf trafficDensity {type uint16;}
            leaf connDensity {type uint16;}
            leaf serviceAreaDimension {type string;}
        }
    }
}
```

Additional properties can include a maximum number of user equipments that can be expected to use a particular slice, coverage areas (or tracking areas) where the slice is available, latency characteristics of the slice, user equipment mobility level (e.g., whether user equipments using the slice are expected to be stationary, nomadic, having a restricted mobility, fast moving, etc.), resource sharing level (as defined by 3GPP standard as shared/not shared), resource isolation level (which may indicate at what level in the RAN, the resources may need to be isolated) and reliability expected for a particular slice. When an operator provides a slice template (as defined by the code shown above), the template should be mapped to specific characteristics within the RAN and the core network.

Figure 6:
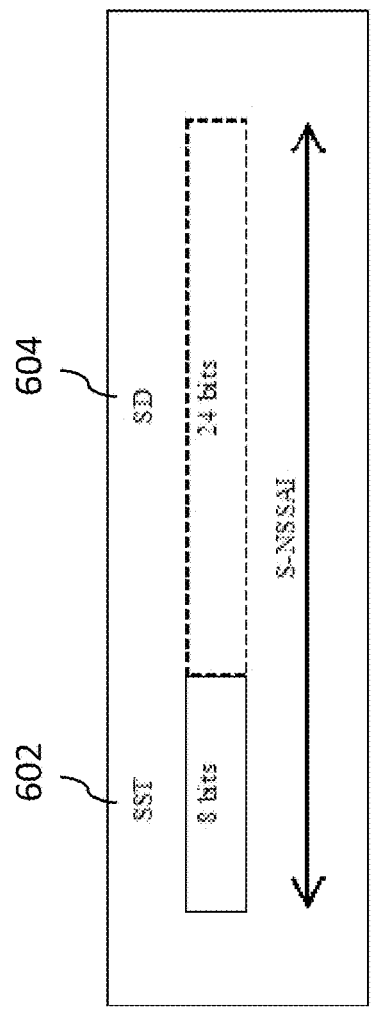
FIG. 6 illustrates an exemplary S-NSSAI identifier.

The above network slicing architecture 500 may be based on an identifier S-NSSAI (Specific Network Slice Selection Assistance Information). FIG. 6 illustrates an exemplary S-NSSAI identifier 600. The identifier 600 includes 8 bits of standardized slice/service type (SST) values 602 (that refers to the expected network slice behavior in terms of features and services), and 24 bits of slice differentiator (SD) values 604 (that refers to an optional information that complements the slice/service type(s) to differentiate between different network slices of the same slice/service type). An S-NSSAI 600 is used by a user equipment (UE) when accessing network in the public land mobile network (PLMN) that the S-NSSAI is associated with. In particular, the UE while registering to the network provides in its RRC signaling to the RAN a "requested NSSAI", where an NSSAI is a collection of S-NSSAI 600. The RAN uses the requested NSSAI to select an access and mobility management function (AMF) in the 5G core network. The AMF is a common element to all the slices the UE can access. After registration procedure is completed, the UE activates one or more slices by initiating the packet data unit (PDU) session activation procedure. Each PDU session belongs to one slice. The following activation procedure scenarios are possible: one UE accessing multiple network slices (i.e., one UE accessing multiple PDU sessions—with each PDU session using a different S-NSSAI), and one UE accessing one network slice only. However, a network may have deployed multiple network slices with different UEs use different network slices.

Figure 7:
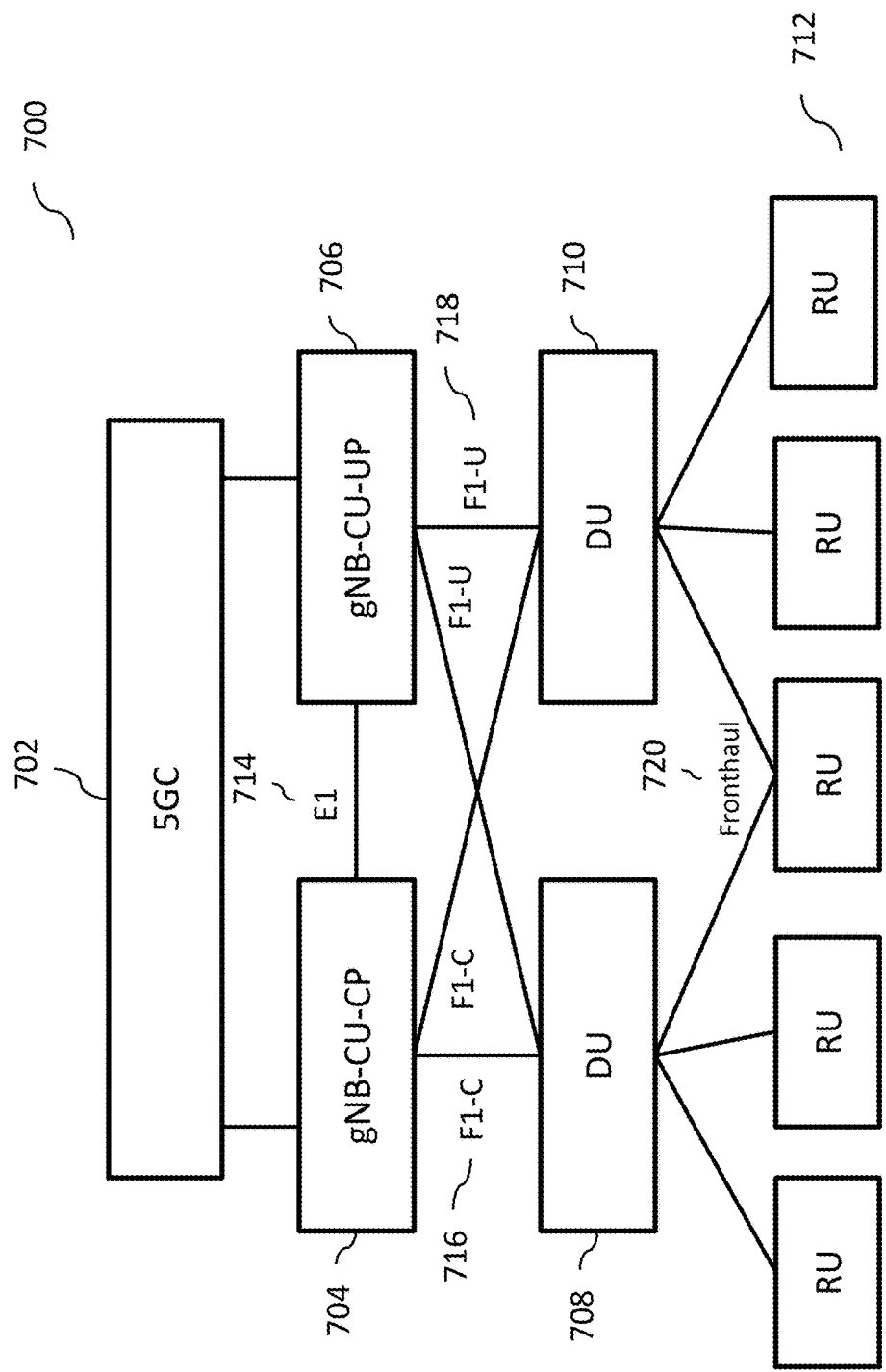
FIG. 7 illustrates an exemplary 5G wireless communication system.

FIG. 7 illustrates an exemplary 5G wireless communication system 700, according to some implementations of the current subject matter. The system 700 can be configured to have a lower layer split architecture in accordance with Option 7-2. The system 700 can include a core network 702 (e.g., 5G Core) and one or more gNodeBs (or gNBs), where the gNBs may have a centralized unit gNB-CU. The gNB-CU can be logically split into control plane portion, gNB-CU-CP, 704 and one or more user plane portions, gNB-CU-UP, 706. The control plane portion 704 and the user plane portion 706 can be configured to be communicatively coupled using an E1 communication interface 714 (as specified in the 3GPP Standard). The control plane portion 704 may be configured to be responsible for execution of the RRC and PDCP protocols of the radio stack.

The control plane and user plane portions 704, 706 of the centralized unit of the gNB can be configured to be communicatively coupled to one or more distributed units (DU) 708, 710, in accordance with the lower layer split architecture. The distributed units 708, 710 can be configured to execute RLC, MAC and upper part of PHY layers protocols of the radio stack. The control plane portion 704 can be configured to be communicatively coupled to the distributed units 708, 710 using F1-C communication interfaces 716, and the user plane portions 706 can be configured to be communicatively coupled to the distributed units 708, 710 using F1-U communication interfaces 718. The distributed units 708, 710 can be coupled to one or more remote radio units (RU) 712 via a fronthaul interface 720, which in turn communicate with one or more user equipment (not shown in FIG. 7). The remote radio units 712 can be configured to execute a lower part of the PHY layer protocols as well as provide antenna capabilities to the remote units for communication with user equipments (similar to the discussion above in connection with FIGS. 1a-2).

IV. End-to-End Network Slicing

In some implementations, to provide end-to-end slicing capabilities, a base station may be configured with one or more executable processes (e.g., end-to-end solutions) for performing slice separation at various points in the communication system 700, as shown in FIG. 7. Determination as to where slice separation should occur can be dependent on various network parameters, requirements of a communication session, and/or any other factors. The solutions can include slice separation occurring: (a) at user plane portions of the centralized unit, (b) at distributed units, and (c) at remote units. One or more of these solutions can be implemented in the system 700 and are discussed below.

A. Slice Separation at User Plane Portions of Centralized Unit

Figure 8A:
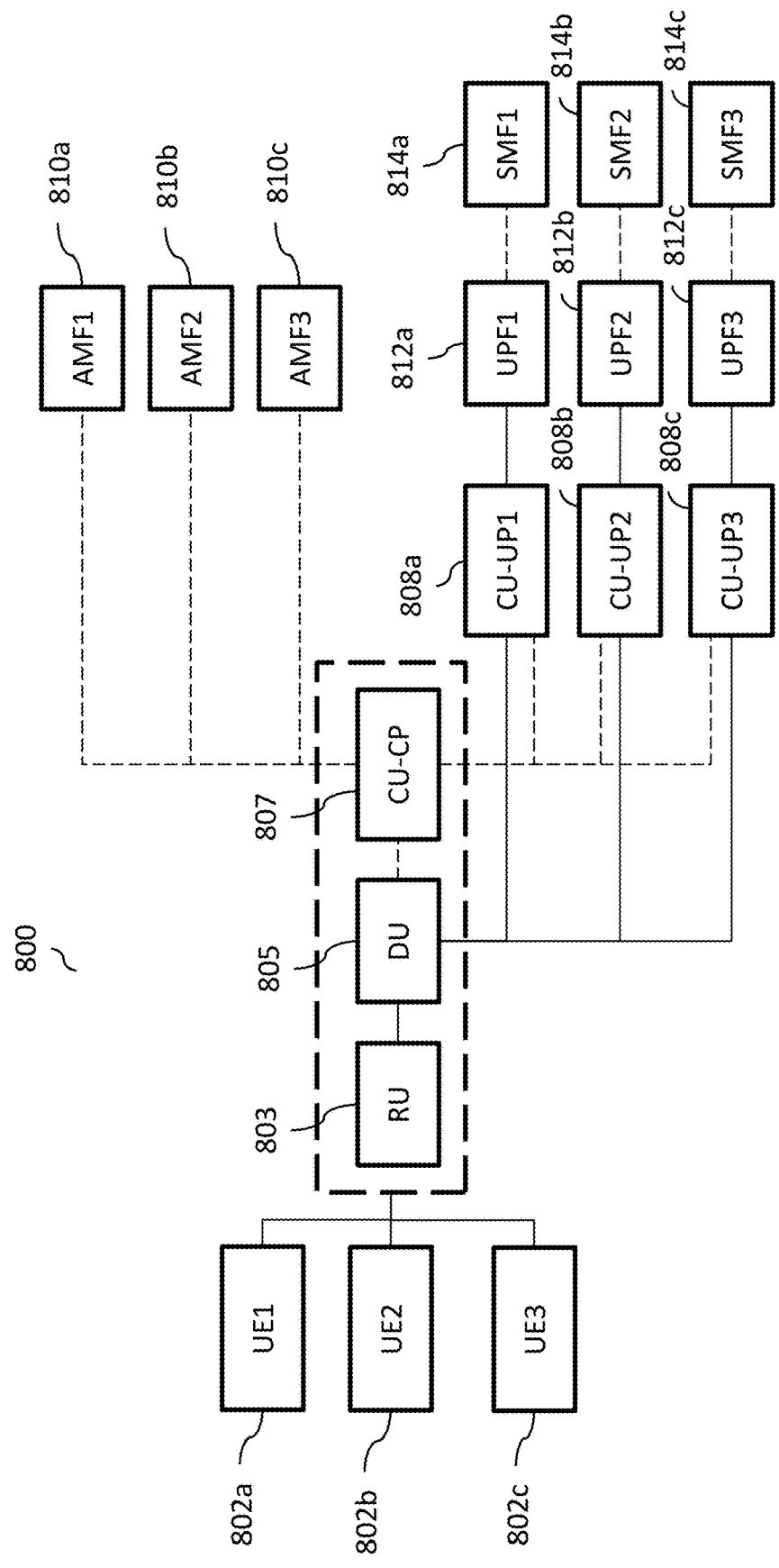
FIG. 8a illustrates an exemplary communication system for performing network slice separation at user plane portions of the centralized unit, according to some implementations of the current subject matter.

FIG. 8a illustrates an exemplary communication system 800 for performing network slice separation at user plane portions of the centralized unit, according to some implementations of the current subject matter. The system 800 is similar to the system 700 shown in FIG. 7 and for ease of illustration and discussion, only relevant portions are shown in FIG. 8a.

The system 800 can include one or more user equipments 802 (a, b, c), a remote unit 803, a distributed unit 805, and a control plane portion 807 of the centralized unit. In this implementations, units 803-807 can be common to all network slices (three slices are shown in FIG. 8a). This means that all user equipments 802 may access the same units 803-807 before network slice split occurs at the user plane portion of the centralized unit.

As shown in FIG. 8a, isolation between network slices can be provided from the gNB-CU-UP onwards. In particular, separate gNB-CU-UP instances 808 (a, b, c) can be created by the radio access network for each slice that may be configured to serve or allow access by the respective user equipment 802 (a, b, c). Further, because of the separation of slices, separate respective instances of access and mobility functions (AMF) 810 (a, b, c), user plane functions (UPF1-3) 812 (a, b, c), and session management functions (SMF1-3) 814 (a, b, c) may be also created. Each network slice can be identified by the designations a, b, or c (in addition to any common portions).

In the 5G network, access and mobility management function (AMF) (which replaced the MME entity in the 4G network) receives connection and session related information from the user equipment and is responsible for handling connection and mobility management tasks. Messages related to session management can be forwarded to the session management function (SMF). The SMF is responsible for interacting with the decoupled data plane, creating, updating and removing protocol data unit (PDU) sessions and managing session context with the user plane function (UPF). The UPF provide an interconnect between the mobile infrastructure and the data network (DN) (encapsulation and decapsulation of GPRS Tunneling Protocol for the user plane (GTP-U). It also performs packet routing and forwarding, including directing flows to specific data networks based on traffic matching filters as well as acts as an intermediate UPF (I-UPF) to more than one PDU session. The UPF further performs application detection using service data flow (SDF) traffic filter templates or 3-tuple packet flow description (i.e., protocol, server-side IP address and port number) that is received from the SMF. It also performs per-flow QoS handling, which includes transport level packet marking for uplink (UL) and downlink (DL), rate limiting and reflective QoS marking on the DL. Moreover, the UPF reports on traffic usage, such as for the purposes of billing, lawful intercept, etc. functions.

Referring back to FIG. 8a, in some implementations, selection of a specific set of slices may be based on the NSSAI parameter requested by the user equipment 802 during registration procedure and the selection of a specific slice may be based on the S-NSSAI parameter that each user equipment 802 requested during PDU session establishment procedure. Specifically, using the NSSAI parameter (which may include one or more S-NSSAI parameters), an appropriate AMF 810 can be selected during registration procedure. Using the S-NSSAI parameter, the AMF 810 may select an appropriate SMF 814, during the PDU session establishment procedure. Because requested NSSAI parameter from each user equipment 802 can be different, different respective AMFs 810 can be allocated to different user equipments 802. Similarly, respective UPF 812 and SMF 814 can be selected based on the S-NSSAI requested by the user equipment 802 during PDU session establishment procedure. Again, because requested S-NSSAI from each user equipment can be different, different UPF 812 and SMF 814 can be allocated to different user equipments 802. For example, user equipment 802 a can be allocated CU-UP 808a, UPF1 812a, AMF1 810a, and SMF1 814a, where each of these functionalities is configured to be specific to a particular network slice.

Figure 8B:
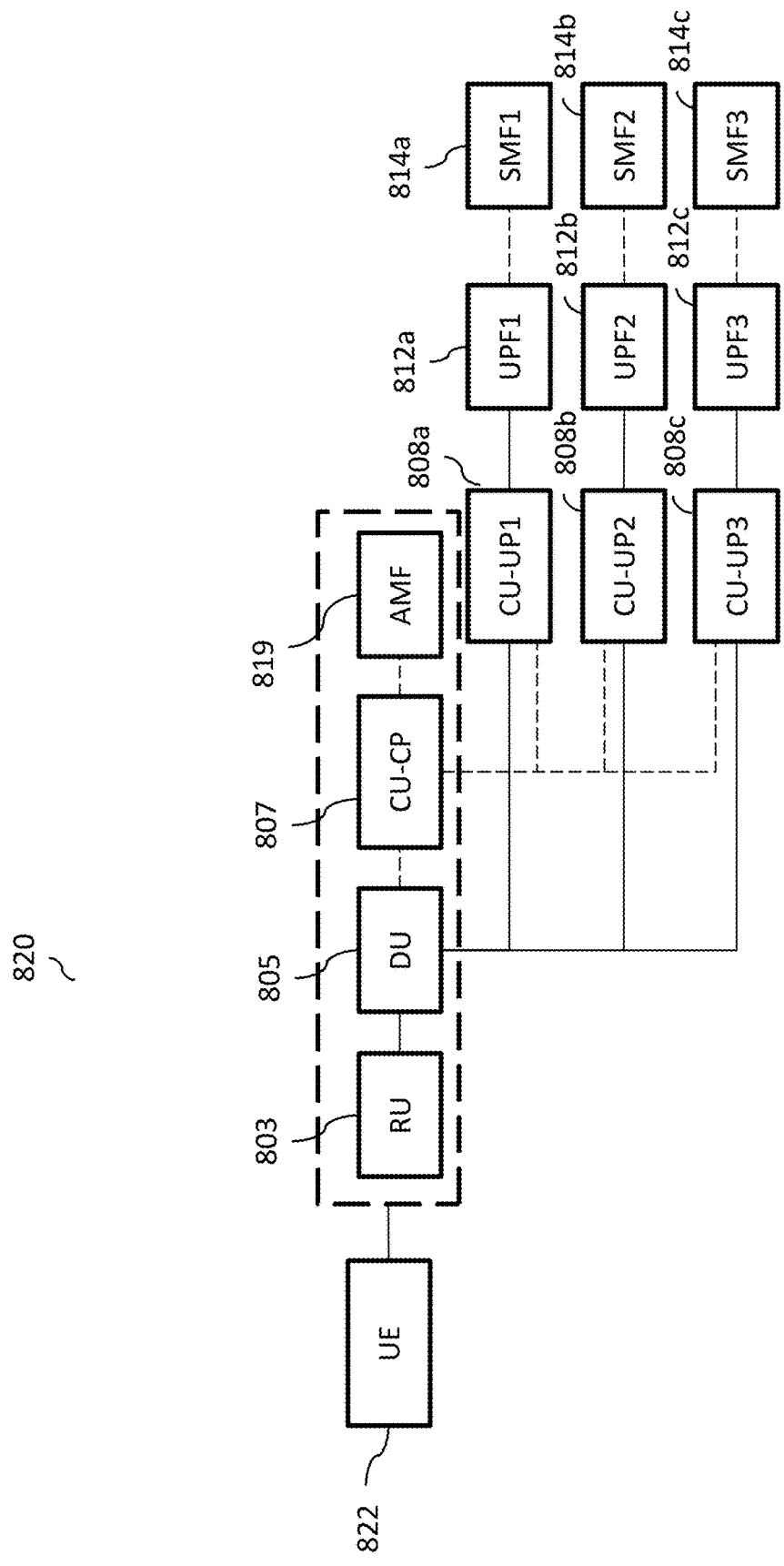
FIG. 8b illustrates an exemplary communications system having one user equipment that can use one or more network slices, according to some implementations of the current subject matter.

In some implementations, one user equipment can be configured to use more than one network slice. FIG. 8b illustrates an exemplary communications system 820 having one user equipment 822 that can use one or more network slices, according to some implementations of the current subject matter. The system 820 can be similar to the system 800 shown in FIG. 8a. However, instead of multiple AMF components as shown in FIG. 8a, RU 803, DU 805, CU-CP 807, and a single AMF 819 can be common to all network slices. The remainder of the system 820 is similar to the system 800 shown in FIG. 8a. In operation, depending on the S-NSSAI that the user equipment 822 has requested for each PDU session, different user plane portions (i.e., CU-UP) 808 can be allocated for the user equipment 802.

B. Slice Separation at Distributed Unit Portions

Figure 9A:
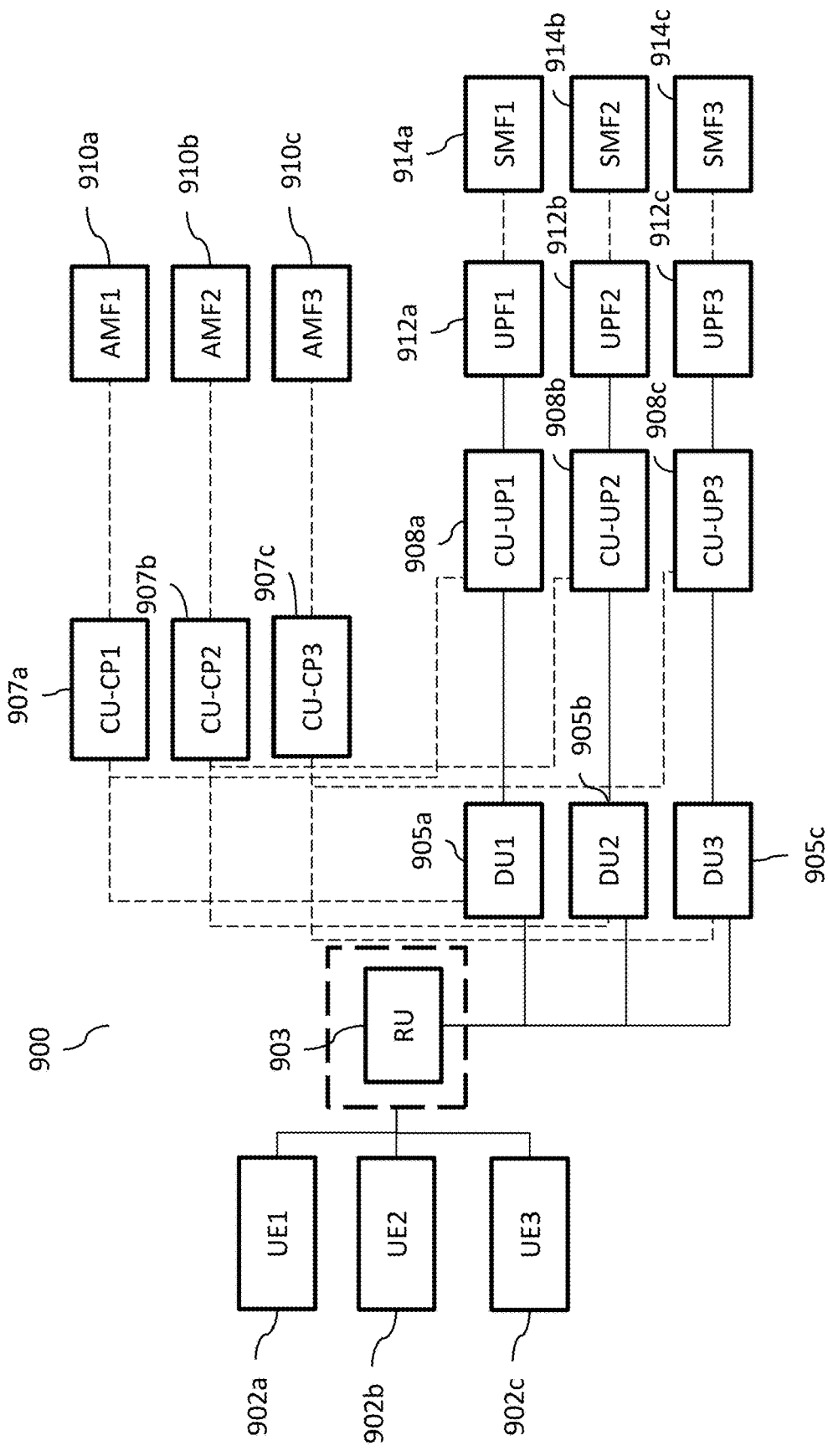
FIG. 9a illustrates an exemplary communication system for performing network slice separation at distributed unit (DU) portions, according to some implementations of the current subject matter.

FIG. 9a illustrates an exemplary communication system 900 for performing network slice separation at distributed unit (DU) portions, according to some implementations of the current subject matter. The system 900 is similar to the system 700 shown in FIG. 7 and again, for ease of illustration and discussion, only relevant portions are shown in FIG. 9a.

The system 900 can include one or more user equipments 902 (a, b, c), a common remote unit 903, one or more distributed units DU1-3 905 (a, b, c), and one or more corresponding control plane portions CU-CP1-3 907 (a, b, c) of the centralized unit. In this implementations, only unit 903 can be common to all network slices (similar to FIGS. 8a-b) three slices are shown in FIG. 9a). This means that all user equipments 902 may access the same remote unit 903 before network slice split occurs at the distributed units 905.

As shown in FIG. 9a and stated above, isolation between network slices can be provided from the DU onwards. In particular, in addition to the separate DU1-3 905, control portions CU-CP1-3 907, separate CU-UP instances 908 (a, b, c) can be created by the radio access network for each slice that may be configured to serve or allow access by the respective user equipment 902 (a, b, c). Similarly, separate respective instances of access and mobility functions (AMF) 910 (a, b, c), user plane functions (UPF1-3) 912 (a, b, c), and session management functions (SMF1-3) 914 (a, b, c) can be also created.

Selection of a specific slice in the system 900 can be similar to the selection procedure discussed above with regard to FIGS. 8a-b. In particular, different respective AMFs 910, UPF 912 and SMF 914 can be allocated to different user equipments 902. For example, user equipment 902a can be allocated DU 905a, CU-CP 907a, CU-UP 908a, UPF1 910a, AMF1 912a, and SMF1 914a, where each of these functionalities is configured to be specific to a particular network slice. Each network slice can be identified by the designations a, b, or c (in addition to any common portions).

In some implementations, because DUs 905 control radio bandwidth, each network slice can be allocated a specific bandwidth part (BWP) within a carrier's bandwidth. The 5G NR communications network can allow splitting of a carrier bandwidth into multiple bandwidth parts (as defined in the 3GPP standard). Each DU 905 can be configured to control one such bandwidth part. Within the carrier bandwidth, different BWP can be assigned different physical resource blocks (PRBs). For example, if a carrier bandwidth (CBW) is 100 MHz with sub-carrier spacing of 30 KHz, it will have a total of 273 PRBs. If this CBW is split into 4 BWPs with one BWP can be 40 MHz, then other 3 BWPs can be 20 MHz each. Each BWP can be assigned its own share of PRBs from the total 273 PRBs. Further, different user equipments 902 that use different slices can be configured with that respective slice's specific BWP during PDU session establishment procedure (i.e., during RRC reconfiguration for dedicated radio bearer (DRB) setup).

The RU 903 can be configured to support multiple BWPs within a carrier bandwidth. Depending on the BWP on which an uplink message is received, the RU 903 can route the message over the fronthaul interface to the correct DU 905, where each DU 905, as stated above, can be connected to its slice specific CU-CP 907 and that is connected to slice specific CU-UP 908 and AMF 910. This way, except for RU 903, the rest of the radio processing and core network processing can be completely isolated for each network slice.

Figure 9B:
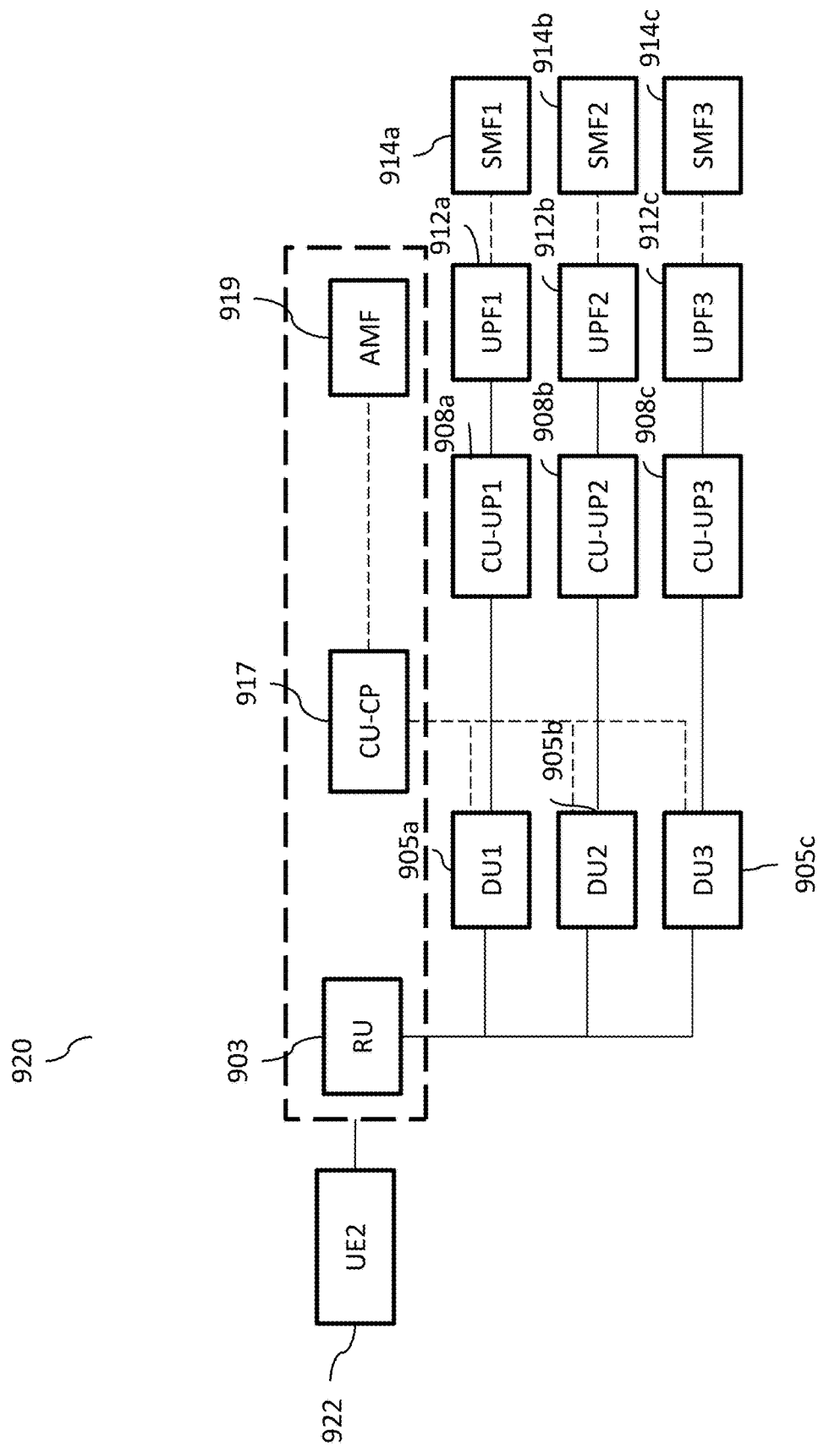
FIG. 9b illustrates an exemplary communications system having one user equipment that can use one or more network slices, according to some implementations of the current subject matter.

In some implementations, similar to the discussion in connection with FIG. 8b, one user equipment can be configured to use more than one network slice. FIG. 9b illustrates an exemplary communications system 920 having one user equipment 922 that can use one or more network slices, according to some implementations of the current subject matter.

The system 920 can be similar to the system 900 shown in FIG. 9a. However, instead of multiple AMF components as shown in FIG. 9a, RU 903, CU-CP 917, and AMF 919 can be common to all network slices. The remainder of the system 920 can be similar to the system 900 shown in FIG. 9a. In operation, instead of controlling the RU 903 to split the traffic based on BWP, the split can be based on different component carriers. The user equipment 922 can be configured via RRC to use two component carriers in two different cell groups (e.g., dual connectivity scenario). For example, when the user equipment 922 is using the one slice (e.g., represented by components 905a, 908a, 912a, 914a), it can use one component carrier (CC1) and when it is using another slice (e.g., represented by components 905b, 908b, 912b, 914b), it can use another component carrier (CC2), and so forth.

In an alternate implementation, traffic may be split from RU to different DUs based on PRB ranges that may be allocated to different slices within the same BWP and/or same component carrier. For example, assuming a scenario of a carrier bandwidth of 100 MHz that is not split into BWPs, out of 273 PRBs, PRB range 1-100 may be used for slice 1 and PRB range 101-200 may be used for another slice, the RU may split an uplink traffic to respective DUs using the above PRB split (i.e., based on which PRBs that uplink traffic was received).

C. Slice Separation at Remote Radio Unit Portions

Figure 10:
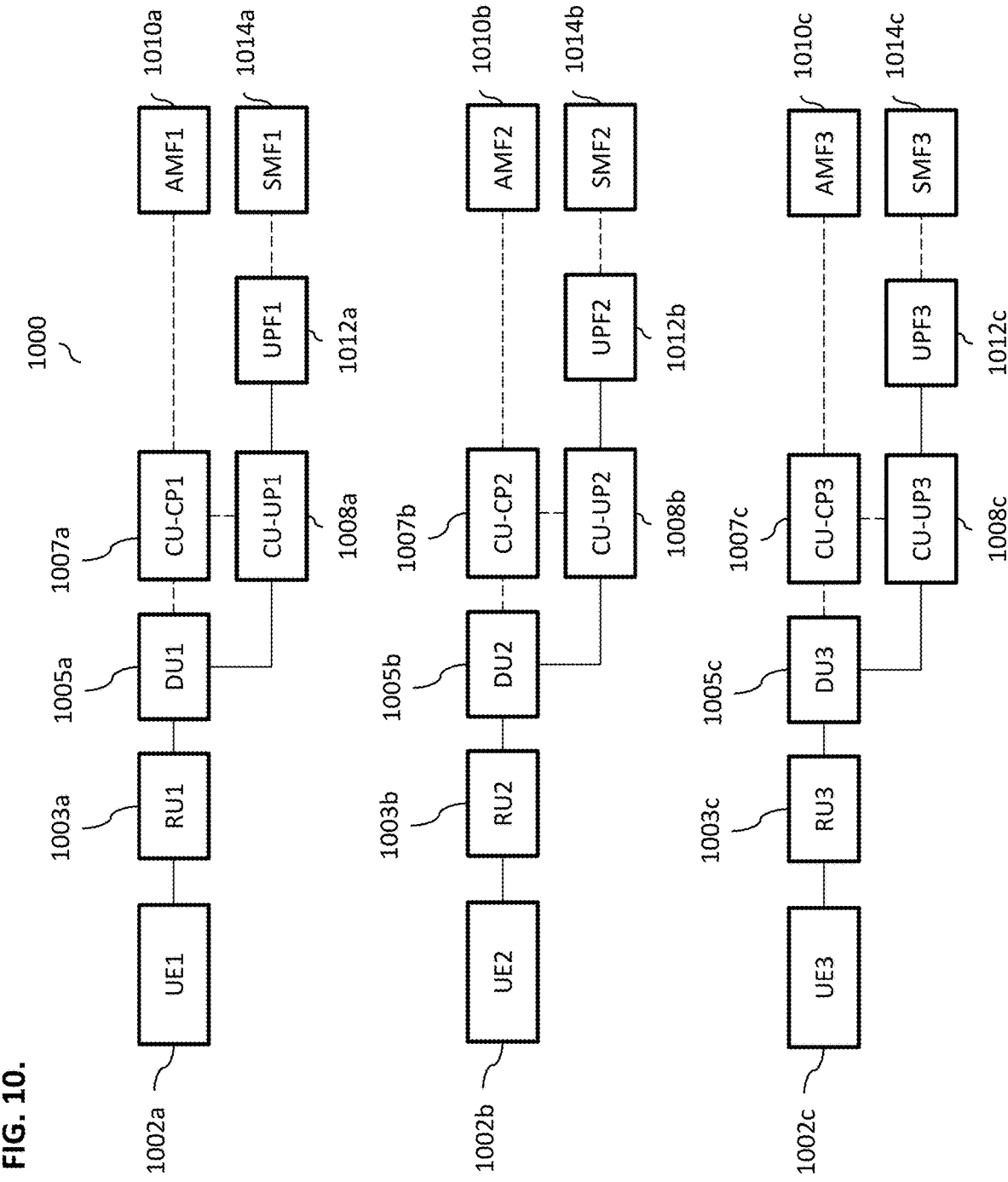
FIG. 10 illustrates an exemplary communication system for performing network slice separation at remote radio unit (RU) portions, according to some implementations of the current subject matter.

FIG. 10 illustrates an exemplary communication system 1000 for performing network slice separation at remote radio unit (RU) portions, according to some implementations of the current subject matter. The system 1000 is similar to the system 700 shown in FIG. 7 and again, for ease of illustration and discussion, only relevant portions are shown in FIG. 10.

The system 1000 can include one or more user equipments 1002 (a, b, c), one or more remote radio units RU1-3 1003 (a, b, c), one or more distributed units DU1-3 1005 (a, b, c), one or more control plane portions CU-CP1-3 1007 (a, b, c) of the centralized unit, one or more user plane portions CU-UP1-3 1008 (a, b, c), one or more UPF1-3 1012 (a, b, c), one or more SMF1-3 1014 (a, b, c), and one or more AMF1-3 1010 (a, b, c). Each network slice can be identified by the designations a, b, or c. In this implementation, no units are common to any of the three network slices. This means that all user equipments 1002 can access their own designated network slices a, b, or c, as each network slice can be mapped to a different component carrier. Further, different RUs can be placed in each cell site with one RU radiating one component carrier. Depending on the S-NSSAI that a particular user equipment 1002 is using, it can be configured to use a respective component carrier.

As shown in FIGS. 8a-10, one or more remote radio units can be connected to one or more distributed units (where connections can be defined by various standards). In particular, a remote unit can be controlled by one or more distributed units using one or more I/Q data samples (showing changes in magnitude (or amplitude) and phase) sent and/or received to indicate which distributed unit is handling which component carrier or which set of PRBs within the carrier bandwidth. Distributed unit's DU port ID parameter can be used to differentiate processing units at the distributed unit. The DU port ID parameter can be included in a section type control message eCPRI header along with carrier component ID (CC ID), and remote unit port ID (RU port ID). Each distributed unit can configure at least one of a different component carrier, band sector, subframe, slot in the remote unit, etc. Moreover, each distributed unit can configure the remote unit for different user equipment identifiers. Lastly, depending on which slot/subframe an I/Q sample has been received, the remote unit can send that sample to the right distributed unit.

Referring back to FIGS. 8a-10, the systems shown in these figures provide various ways for flexibly configuring a base station (e.g., gNB) to accommodate various desired isolation of network slices. One level of isolation (e.g., $1^{st}$ level of isolation) can occur from a user plane portion of a centralized unit (CU-UP) onward in the processing pipeline, where remote and distributed units (RU and DU) can be shared. In the DU, all physical (PHY) layer, MAC and RLC configurations and resources can be shared with other slices. This is illustrated by the system 800 shown in FIGS. 8a-b.

Another level of isolation (e.g., $2^{nd}$ level of isolation) can occur from CU-UP onward in the processing pipeline with shared RU and DU, but in the DU, each network slice (as identified by S-NSSAI parameter discussed above) can have a specific physical layer, MAC, RLC and PDCP configurations. For example, each requested S-NSSAI parameter can be mapped to a specific component carrier and/or a specific cell defining synchronization signal block (SSB) within the same component carrier or a specific BWP within the DU. This level of isolation can be similar to the systems shown in FIGS. 8a-b but with multiple component carrier/cell defining SSB/BWP configurations within same DU.

In some implementations, another level of isolation (e.g., $3^{rd}$ level of isolation) can occur from the distributed unit onwards with each slice mapping to a different distributed unit (e.g, as shown in FIG. 9a). When a particular user equipment is using more than one slice (e.g., as shown in FIG. 9b), the user equipment can be simultaneously connected to two or more DUs and can be configured with separate MAC entities for master cell group (MCG) and secondary cell group (SCG) distributed units. In some implementations, it may be possible to host the distributed units of each slice (i.e., slices a, b, c as shown in FIG. 9a) at different locations depending on the latency and/or other SLA requirements of each slice.

In some implementations, yet another level of isolation (e.g., 4$^{th}$ level of isolation) can include isolation at RU onward in the processing pipeline. In this case, there can be complete end-to-end isolation of user plane traffic. Each remote unit can support a separate component carrier. The user equipment can be configured to use separate MAC entities, as MCG and SCG, towards each distributed unit, as shown in FIG. 10.

Figure 11:
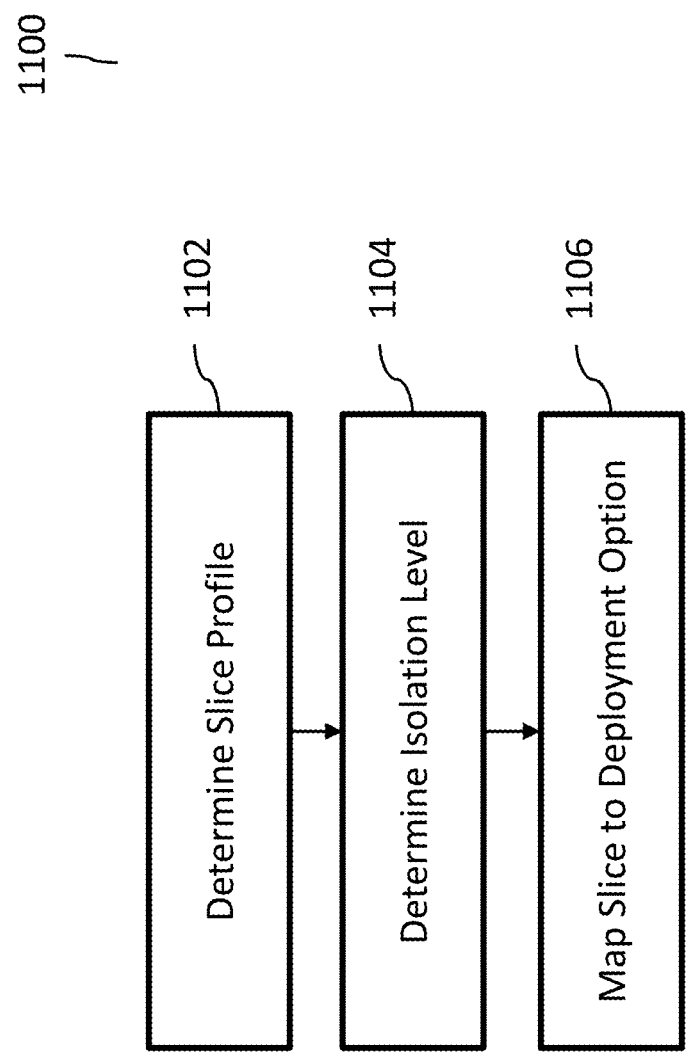
FIG. 11 illustrates an exemplary method for mapping one or more network slice to a particular deployment option discussed with respect to FIGS. 8a-10, according to some implementations of the current subject matter.

FIG. 11 illustrates an exemplary method 1100 for mapping one or more network slices to a particular deployment option discussed with respect to FIGS. 8a-10, according to some implementations of the current subject matter. At 1102, a network slice profile can be determined (as discussed above). Once the network slice profile is ascertained, the level of isolation can be determined, at 1104. The combination of the network slice profile and the level of isolation can be used to determine which solution (i.e., deployment option discussed in connection with FIGS. 8a-10) can be selected, at 1106.

In some implementations, various combinations of the slice profile information and levels of isolation can determine which solution can be to be used in a particular setting. By of a non-limiting example, in view of the discussion above, nine combinations of slice-profile-level-of-isolation scenarios can exist. As can be understood, the current subject matter is not limited to these combination and other factors may be used to select a specific solution discussed above or any other solution.

In some implementations, parameters that may be characterizing the slice profiles can include at least one of the following: latency, number of UEs in a slice, number of tracking areas, UE mobility levels, level of isolation, activity factor, and/or any other parameters. In a first exemplary combination (i.e., operations 1102 and 1104 shown in FIG. 11), a slice profile may be characterized by a medium to high latency, high number of UEs in the slice (e.g., millions), large number of tracking areas where slice is supported (e.g., greater than or equal to 1500 (which implies that per TA or per cell the number of UEs can be around 700) that load each cell or sector in the RAN with maximum number of UEs, nomadic or restricted mobility of UEs, first level of isolation (as discussed above), and a high activity factor (implying that the network slice is always active). Based on this combination, the implementation shown in FIG. 8a can be selected for processing of data to/from user equipment. In this combination, since latency requirements are medium to high, the CU-CP and CU-UP can be placed in regional data centers and hence, far away from DU.

In a second exemplary combination, the latency parameter can be low with the remaining parameters being similar to the first exemplary combination. Here, again, the implementation shown in FIG. 8a can be selected for processing of data to/from user equipment. Since latency requirements are low, the CU-CP and/or CU-UP can be placed close to the DU. Placement of CU-CP closer to DU can be determined based on whether low control plane latency is required for the slice. Placement of CU-UP closer to DU can also be determined based on whether low user plane latency is required for the slice.

In a third exemplary combination, the slice profile parameters can be similar to the first exemplary combination with the exception of the level of isolation, which is changed to the second level of isolation. In this case, the implementation shown in FIG. 8a can again be selected and separate component carriers/cell defining SSB/BWP can be used for each slice.

In a fourth exemplary combination, the slice profile parameters can be similar to the second exemplary combination (i.e., low latency) with the exception of the level of isolation, which is changed to the second level of isolation. Again, the implementation shown in FIG. 8a can be selected and separate component carriers/cell defining SSB/BWP can be used for each slice.

In a fifth exemplary combination, the slice profile parameters can be similar to the first exemplary combination with the exception of the level of isolation, which is changed to the third level of isolation. In this case, implementation shown in FIG. 9a can be selected. Here, similar to the first exemplary combination, the CU-CP and CU-UP can be placed in regional data centers and hence, far away from DU.

In a sixth exemplary combination, the slice profile parameters can be similar to the second exemplary combination (i.e., low latency) with the exception of the level of isolation, which is changed to the third level of isolation. In this case, again, the implementation shown in FIG. 9a can be selected. Similar to the discussion of the second exemplary combination, the CU-CP and/or CU-UP can be placed close to the DU, where placement of CU-CP closer to DU can be determined based on whether low control plane latency is required for the slice and placement of CU-UP closer to DU can also be determined based on whether low user plane latency is required for the slice.

In a seventh exemplary combination, the slice profile parameters can be similar to the first exemplary combination with the exception of the level of isolation, which is changed to the fourth level of isolation. Here, the implementation shown in FIG. 10 can be selected, where the CU-CP and CU-UP can be placed far away from DU.

In an eighth exemplary combination, the slice profile parameters can be similar to the second exemplary combination (i.e., low latency) with the exception of the level of isolation, which is changed to the fourth level of isolation. In this case, again, the implementation shown in FIG. 10 can be selected and placement of the CU-CP and/or CU-UP closer to the DU can be determined based on whether low control plane latency and/or low user plane latency is required for the slice, respectively.

In a ninth exemplary combination, the slice parameters can be similar to the fifth and/or seventh exemplary combinations with the activity factor and the number of UEs being low. In this case, implementation shown in FIG. 8a can be selected, as there is no need to provide isolated RAN resources for a network slice whose activity is sporadic and a number of UEs is low (as it will unnecessarily waste spectrum). As such, implementation shown in FIG. 8a can be used where isolation is from CU-UP onwards while the DU is shared with other slices.

In some implementations, tracking areas, mobility level, etc. might not affect the slice splitting option selection. These parameters may be used to determine a number of locations in which DU, CU-CP, and/or CU-UP instances may need to be instantiated and/or which functions in the DU and/or CU may need to be activated (for example, for a slice that may be used for stationary user equipments, the mobility profiles, Xn interfaces might not need to be configured in the CU-CP instance).

In some implementations, the process 1100 shown in FIG. 11 can be provisioned by the OAM in the gNB (e.g., as a static table). The mapping of each slice profile to a particular solution and the corresponding placement logic for CU-CP and CU-UP can be configured accordingly.

In some implementations, the current subject matter can also perform monitoring of the slice SLAs by looking at one or more key point indicators (KPIs) that may be reported for each slice. For example, for a particular slice marked as having high activity factor with level 4 isolation (e.g., implementation shown in FIG. 10), reports are received indicating a reduced volume of data traffic (e.g., implying low activity factor), the OAM can change mapping of the slice profile from, for example, implementation shown in FIG. 10 to implementation shown in FIG. 8*a*.

Figure 12:
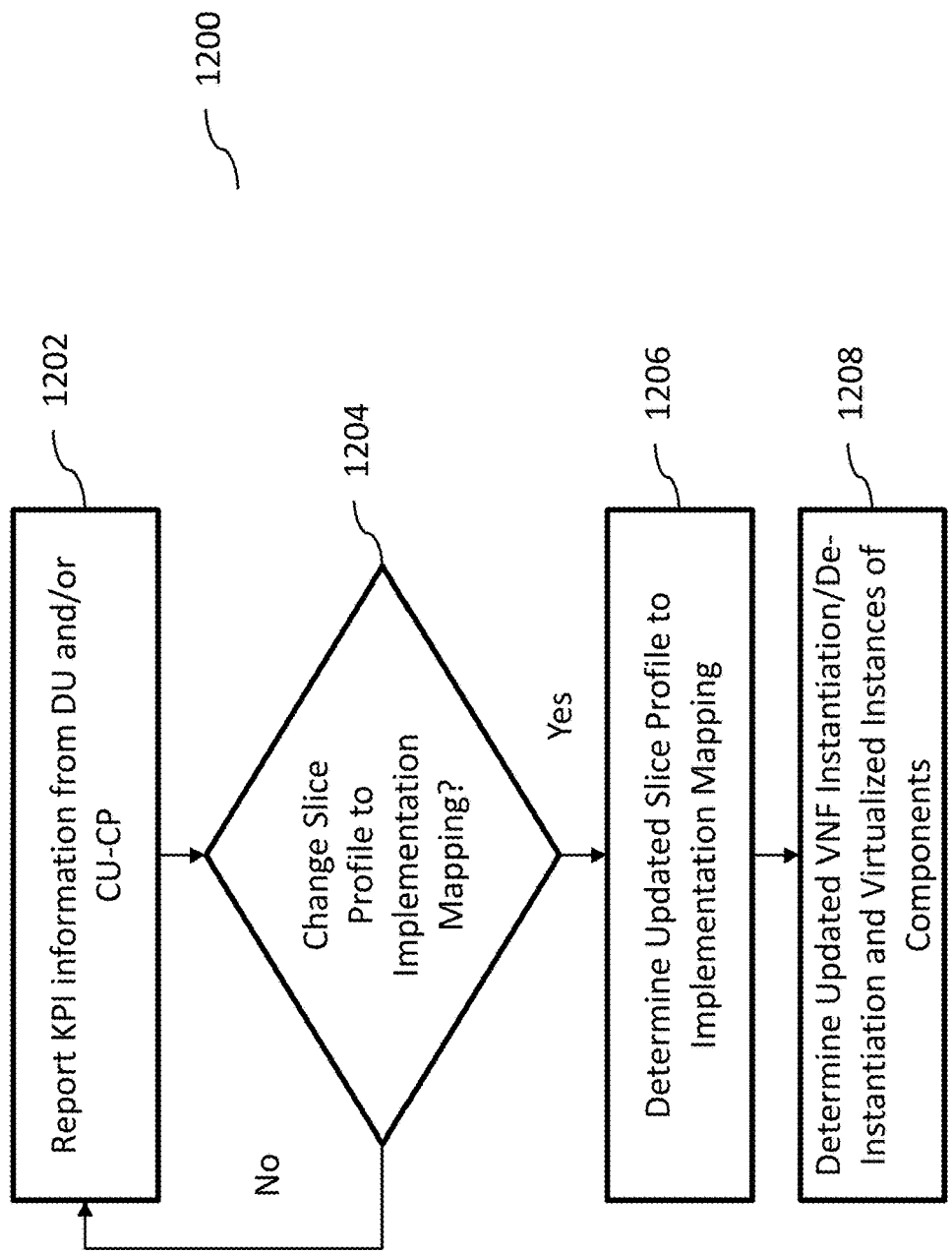
FIG. 12 illustrates an exemplary process for updating slice profile to implementation mapping, according to some implementations of the current subject matter.

FIG. 12 illustrates an exemplary process 1200 for updating profile slice to implementation mapping, according to some implementations of the current subject matter. The process 1200 can be executed by one or more components of the system 700 shown in FIG. 7 and/or any of the components in a 5G architecture. At 1202, one or more distributed units and/or control portions of centralized units may provide status indicators or key performance indicators (KPIs) relating to the various aspects (e.g., latency, number of UEs, activity factors, etc., as discussed above) of a particular current implementation (e.g., as shown in FIGS. 8*a*-10). The KPIs can be provided to operation, administration, and management (OAM) of 5G network. The KPIs can then be provided to operation support systems/business support systems (OSS/BSS) of 5G networks. The OSS/BSS can determine whether a change to the current implementation is needed, at 1204. If so, a new mapping of the slice profile to a particular implementation (e.g., as shown in FIGS. 8*a*-10) can be determined, at 1206. Based on this determination, new virtual network function instantiation/de-instantiation rules for management of virtualized instances of DU, CU-UP, etc. (in accordance with appropriate implementations shown in FIGS. 8*a*-10) can be determined using the new mapping, at 1208. If no changes are required, monitoring and reporting of the KPIs can continue.

V. Resource Isolation or Sharing of Resources Across Multi Operator Networks

In some implementations, the current subject matter may be configured to provide a resource isolation and/or resource sharing for various multi-operator networks, which may be implemented in a 5G communications network environment. Some examples of multi-operator networks include a multi-operator radio access network (RAN) network (MO-RAN), multi-operator core network (MOCN), and others. Some of the aspects of one or more of these networks have been described in various standards (e.g., 3GPP TS 32.130, TS 32.130, TS 23.251, TS23.501, etc.). However, many details of these networks are left open to implementation. In particular, a virtualized RAN architecture can be configured to allow easy deployment of the MORAN network, where each participating operator's (POP) gNB (e.g., gNB-CU, gNB-DU, etc.) can be instantiated as a separate virtual network function (VNF) on a common commercial off-the-shelf (COTS) host that can be owned by a master operator (MOP).

Figure 13:
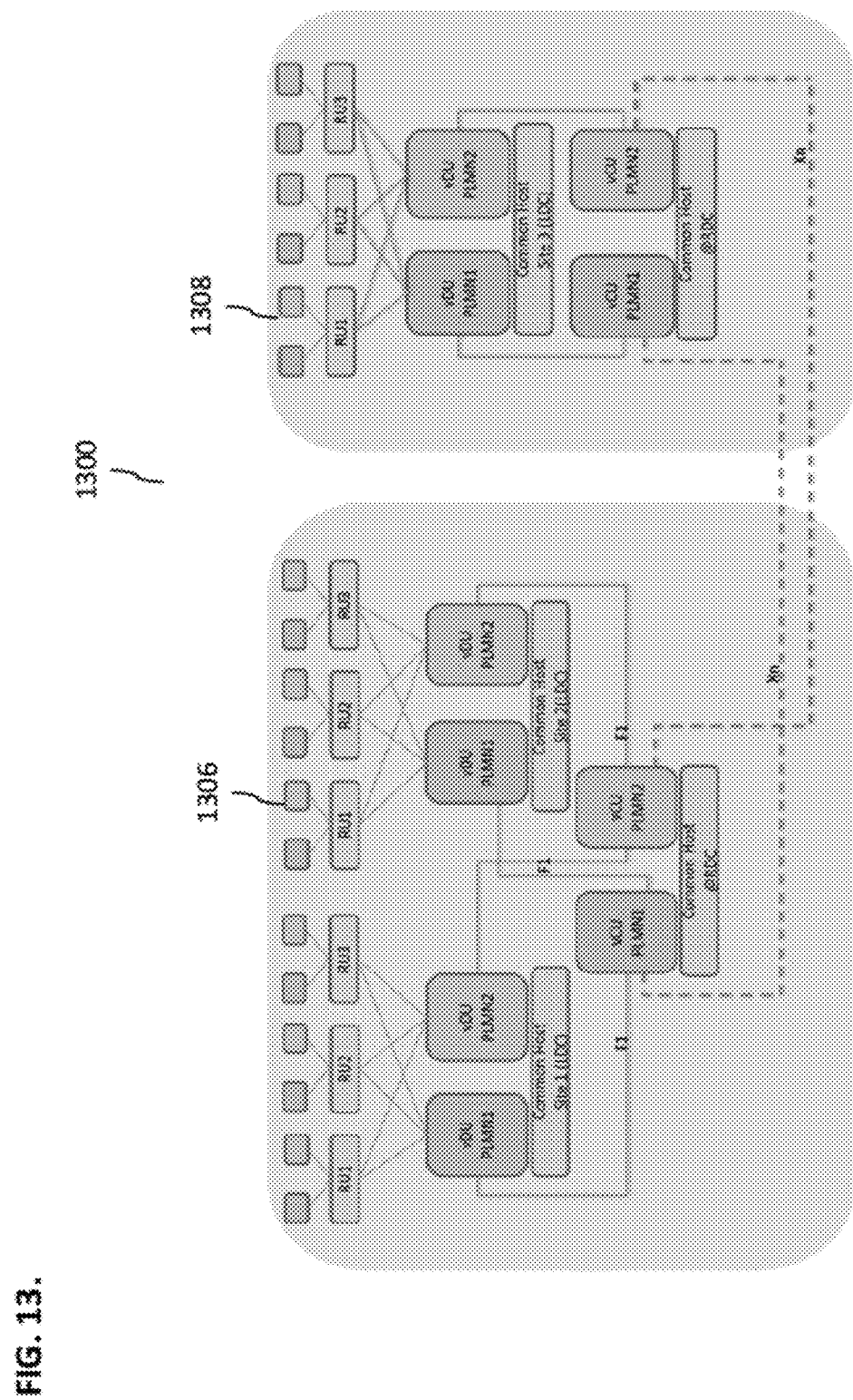
FIG. 13 illustrates an exemplary MORAN network that may be implemented in virtualized RAN on a shared COTS platform.

FIG. 13 illustrates an exemplary MORAN network 1300 that may be implemented in virtualized RAN on a shared COTS platform. In particular, in the network 1300, radio or remote units (RU1-3), Common Hosts (e.g., Sites 1-3, RDC, etc.), as well as other physical infrastructure components may be shared among various public land mobile networks (PLMNs). However, other components (e.g., vDUs, vCUs) can be PLMN-specific entities (e.g., vDUs PLMN1 and vCUs PLMN1 can be part of the PLMN1, whereas vDUs PLMN2 and vCUs PLMN2 can be part of the PLMN2). In some cases, RUs can be partitioned into different component carriers (CC), where each CC can be assigned to a PLMN. Each component carrier can broadcast its own master information blocks/system information blocks (MIB/SIB), where SIB can carry specific PLMN identifiers that can be assigned to that component carrier. User equipments (1306, 1308) can select an appropriate component carrier based on the specific PLMN that they belong to by looking up the PLMN identifier that is broadcast in the SIB.

Figure 14:
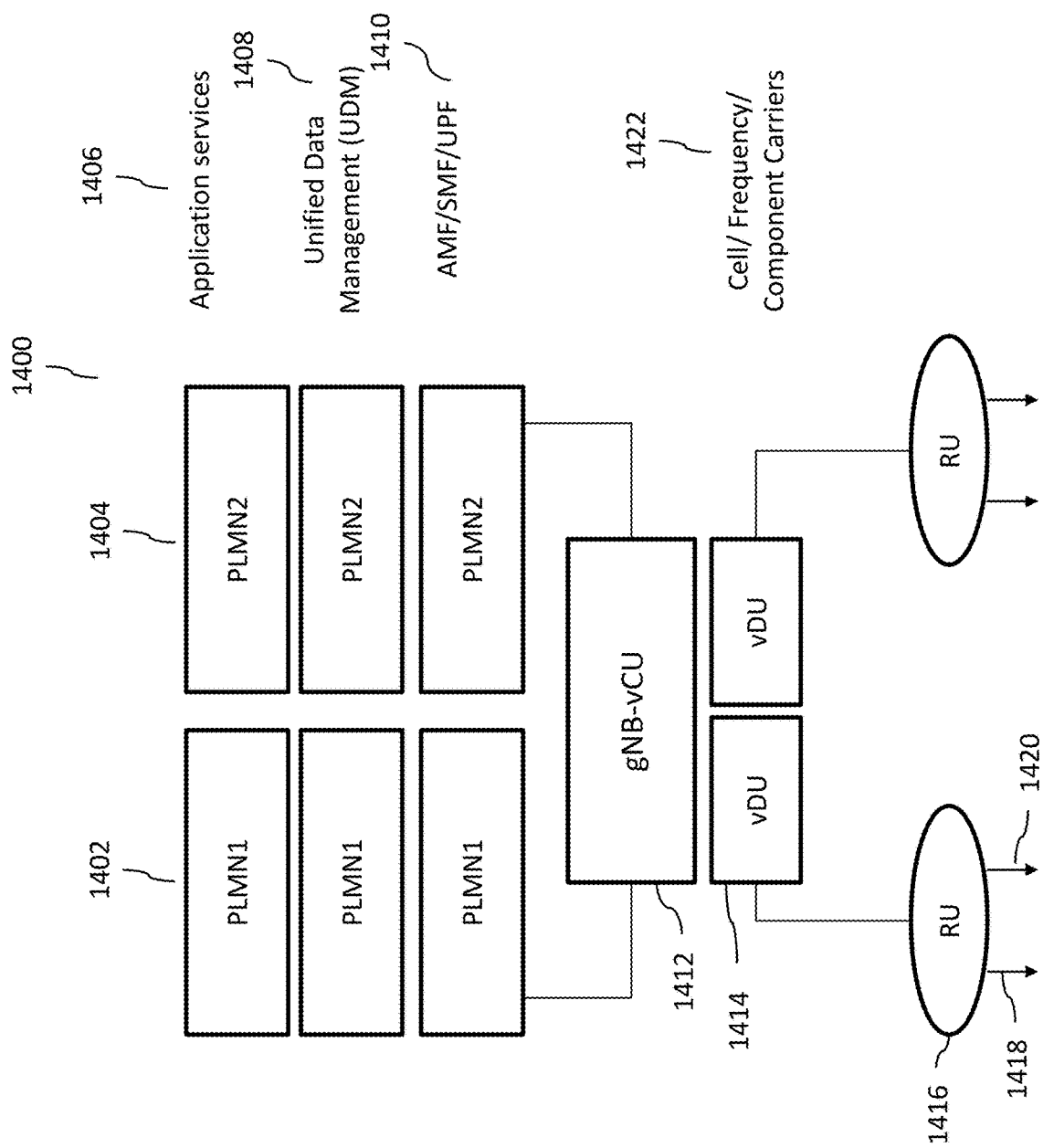
FIG. 14 illustrates an exemplary MOCN system.

FIG. 14 illustrates an exemplary MOCN system 1400. The MOCN architecture has been described in various 3GPP standard specifications (e.g., TS 23.251, 3GPP TS 23.501 clause 5.18). The MOCN system can allow radio resources to be shared across multiple PLMNs. The SIB broadcast can carry up to 12 PLMNs in the new radio communications network. The 3GPP specifications do not describe radio resource partitioning across sharing PLMNs making it implementation specific.

As shown in FIG. 14, the MOCN system 1400 can include PLMN1 components 1402 (which can include application services 1406, unified data management (UDM) 1408, AMF/SMF/UPF 1410) and PLMN2 components 1404 (which can include its respective application services, UDM, AMF/SMF/UPF). The PLMN1-2 1402, 1404 can be communicatively coupled to a common portions of a gNB base station, e.g., vCU 1412, which can, in turn, be communicatively coupled to one or more vDUs 1414. The vDUs 1414 can be communicatively coupled to one or more RUs 1416. The RUs 1416 can be configured to communicate with appropriate user equipments that may belong to the specific PLMN 1402, 1404 (e.g., RU 1416 can communicate with a user equipment belonging to PLMN1 1402 via a link 1418, and with a user equipment belonging to PLMN2 1404 via a link 1420).

In some implementations, the current subject matter may be configured to implement various aspects of the slicing architecture implementations described above with regard to FIGS. 8*a*-10 and may be implemented in a communications system (e.g., 5G communications system) shown in FIG. 7. In particular, the current subject matter may be configured to provide for various implementations of resource isolation and/or sharing in multi-operator networks (e.g., MORAN, MOCN, etc.).

Figure 15A:
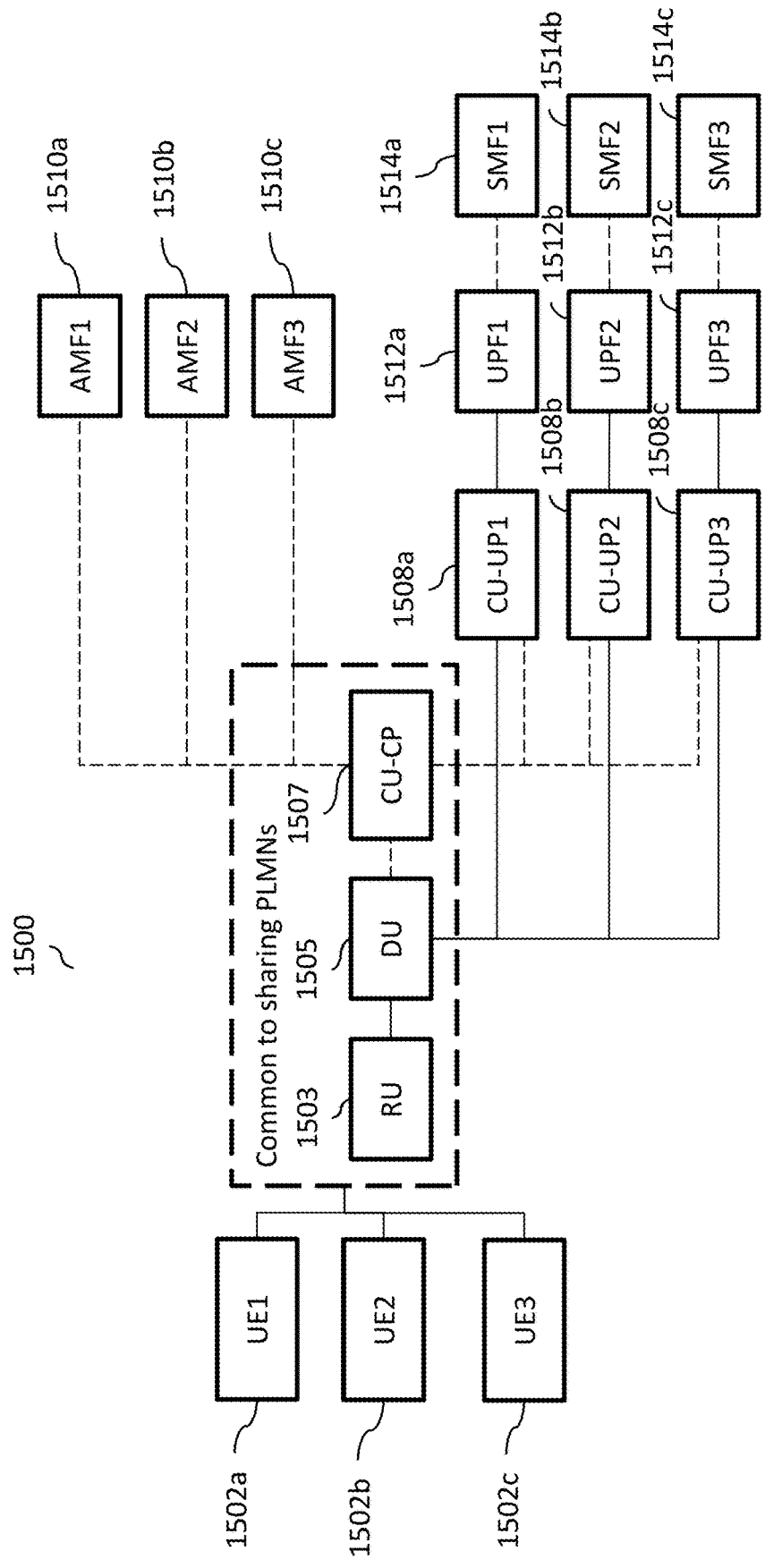
FIG. 15a illustrates an exemplary multi-operator communication system for performing resource isolation sharing in a multi-operator network, according to some implementations of the current subject matter.

FIG. 15*a* illustrates an exemplary multi-operator communication system 1500 for performing resource isolation sharing in a multi-operator network, according to some implementations of the current subject matter. The system 1500 can be similar to the system 800 shown in FIG. 8*a* and can be implemented in a MOCN network.

As shown in FIG. 15*a*, the system 1500 can include one or more user equipments 1502 (*a, b, c*), a remote unit 1503, a distributed unit 1505, and a control plane portion 1507 of the centralized unit that can be common to all PLMNs that may be configured to share resources (as shown in FIG. 15*a*, there are three PLMNs that share the resources (as designated by "a", "b", and "c" in the reference numerals)). This means that all user equipments 1502 may access the same components 1503-1507 prior to occurrence of a split into specific PLMNs.

In particular, PLMN-specific components can be provided from the common gNB-CU-UP onwards. PLMN-specific gNB-CU-UP instances 1508 (*a, b, c*), as well as AMF1-3 1510 (*a, b, c*), UPF1-3 1512 (*a, b, c*), and SMF1-3 1514 (*a, b, c*) can be created in each respective PLMN and can be configured to serve or allow access by the respective user equipment 1502 (*a, b, c*) that may belong to a specific PLMN.

Figure 15B:
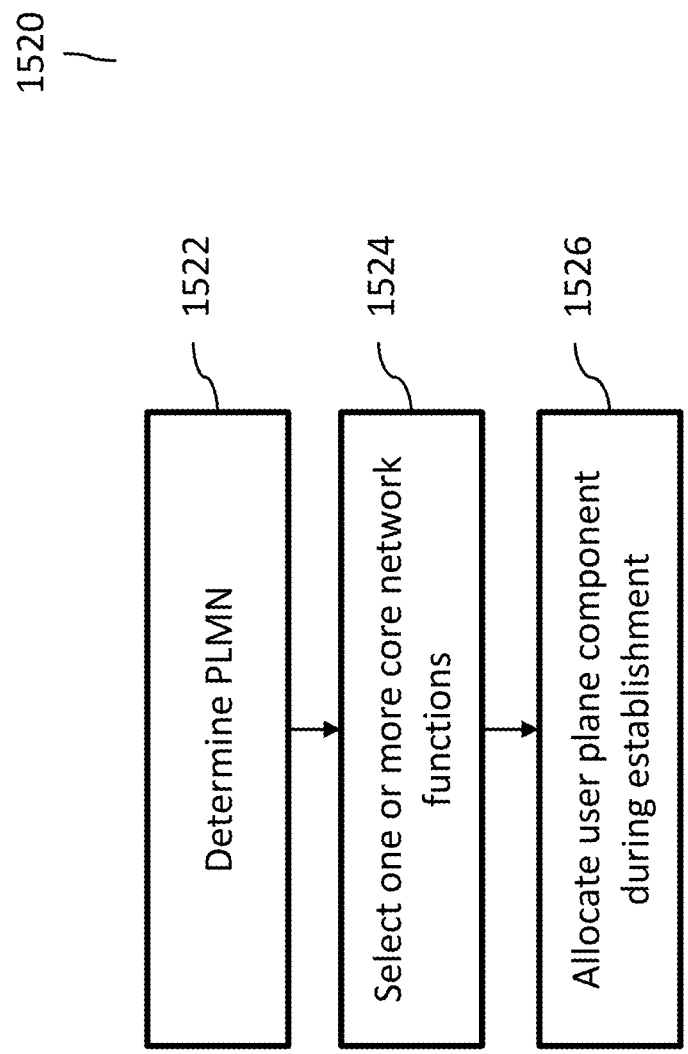
FIG. 15b illustrates an exemplary process for executing resource isolation or sharing using system shown in FIG. 15a, according to some implementations of the current subject matter.

In some implementations, the RU 1503 can be shared by the three PLMNs, where the RU 1503 can be configured to radiate three PLMN identified in system information broadcast (SIB). FIG. 15b illustrates an exemplary process 1520 for executing resource isolation or sharing using system shown in FIG. 15a, according to some implementations of the current subject matter. Based on the specific PLMN to which the user equipment 1502 belongs to (as determined at 1522), the CU-CP 1507 can be configured to select the core network elements AMF 1510 of the specific PLMN, at 1524. For example, AMF1 1510a can be selected for PLMN1; AMF2 1510b can be selected for PLMN2, etc. Once the user equipment's request is routed to the specific AMF (e.g., AMF1 1510a for PLMN1), any further selections of other core network functions, e.g., SMF, UPF (e.g., UPF1 1512a and SMF1 1514a for PLMN1) can occur within that specific PLMN (e.g., PLMN1). Further, CU-CP 1507 can allocate different, e.g., PLMN-specific, CU-UP (e.g., CU-UP1 1508a for PLMN1) during PDU session establishment procedure, at 1526. As stated above RU 1503, DU 1505 and the CU-CP 1507 can be the common network elements.

Figure 16:
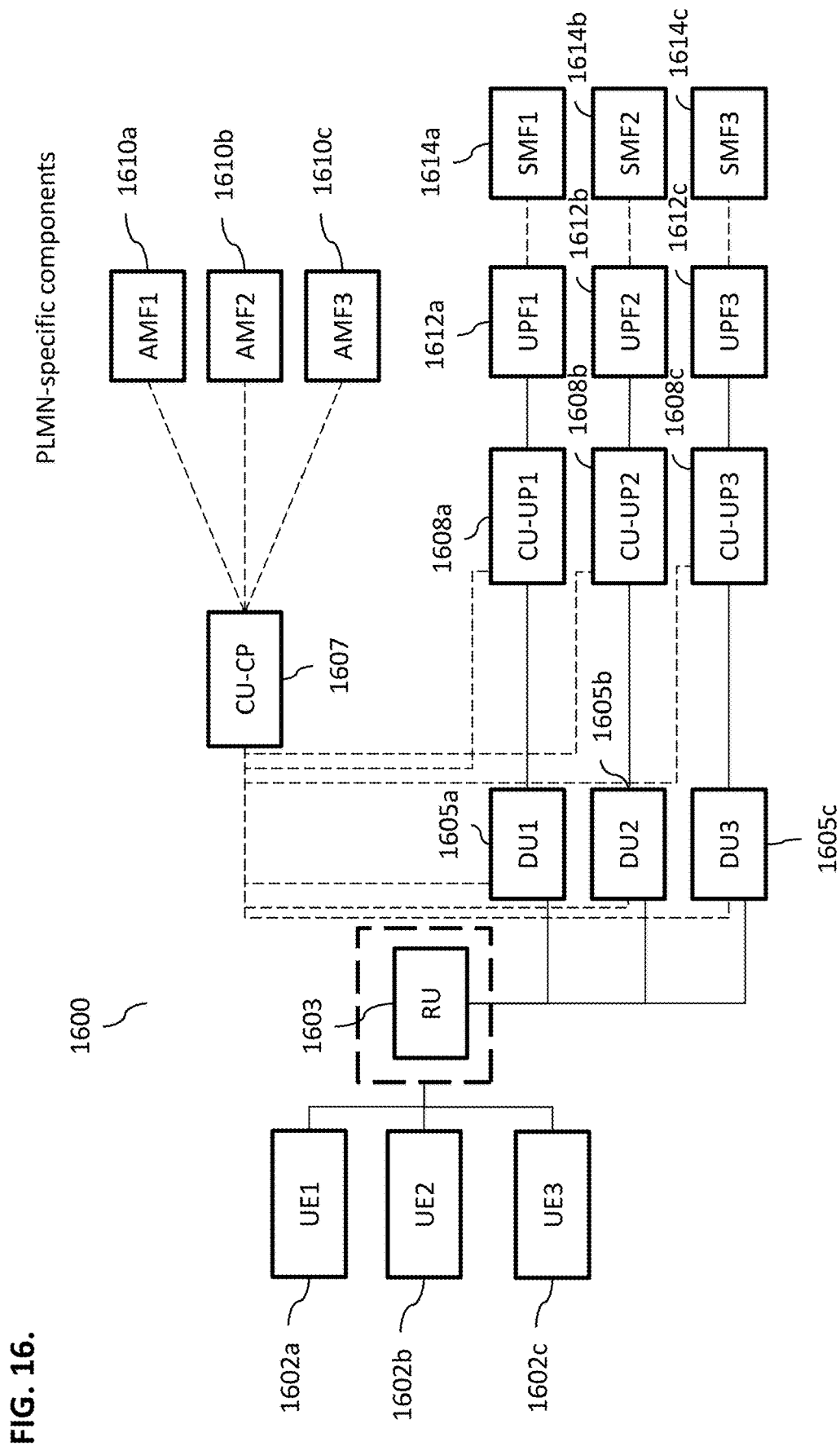
FIG. 16 illustrates an exemplary multi-operator communication system for performing resource isolation sharing in a multi-operator network, according to some implementations of the current subject matter.

FIG. 16 illustrates an exemplary multi-operator communication system 1600 for performing resource isolation sharing in a multi-operator network, according to some implementations of the current subject matter. The system 1600 can be similar to the system 900 shown in FIG. 9a and can be implemented in a MOCN network (similar to system 1500 shown in FIG. 15a). Similar to FIG. 15a, the system 1600 can include one or more user equipments 1602 (a, b, c), a common remote unit 1603, one or more distributed units DU1-3 1605 (a, b, c), and a single control plane portion CU-CP 1607 of the centralized unit. In this implementations, only unit 1603 can be common to PLMNS1-3. This means that all user equipments 1602 may access the same remote unit 1603. Further, in addition to the separate DU1-3 1605, separate CU-UP instances 1608 (a, b, c), separate respective instances of access and mobility functions (AMF) 1610 (a, b, c), user plane functions (UPF1-3) 1612 (a, b, c), and session management functions (SMF1-3) 1614 (a, b, c) can be also created within respective PLMNs.

As stated above, separate DU 1605 instances can be created for the respective PLMNs. Because DUs 1605 control radio bandwidth, each PLMN can be allocated a specific bandwidth part (BWP) within the master operator's carrier bandwidth. The 5G NR communications network can allow splitting of a carrier bandwidth into multiple bandwidth parts (as defined in the 3GPP standard). Each DU 1605 can be configured to control one such bandwidth part. Within the carrier bandwidth, different BWP can be assigned different physical resource blocks (PRBs). For example, if a carrier bandwidth (CBW) is 100 MHz with sub-carrier spacing of 30 KHz, it will have a total of 273 PRBs. If this CBW is split into 4 BWPs with one BWP can be 40 MHz, then other 3 BWPs can be 20 MHz each. Each BWP can be assigned its own share of PRBs from the total 273 PRBs.

Further, different user equipments 1602 that use different slices can be configured with that respective PLMN specific BWP during RRC establishment procedure. The initial BWP of the shared channel bandwidth carries the SSB, MIB and SIB broadcasts while PLMN specific BWP can be configured for the user equipment 1603 after the user equipment 1602 completes initial RRC connection setup. The CU-CP 1607 can be common for all PLMNs and can be configured to control the MB/SIB broadcast(s) and RRC termination. The initial BWP can be controlled from CU-CP 1607 and can use one of the DUs 1605 for the initial BWP. Once the user equipment 1602 has been connected (i.e., RRC connected), the user equipment specific BWP can be controlled via that BWP (PLMN) specific DU 1605 (e.g., UE1 1602a controlled via DU 1605a, etc.).

The RU 1603 can be configured to support multiple BWPs within a carrier bandwidth. Depending on the BWP on which an uplink message is received, the RU 1603 can route the message over the fronthaul interface to the correct DU 1605, where each DU 1605, as stated above, can be connected to its PLMN specific CU-CP 1607 and that is connected to PLMN specific CU-UP 1608 and AMF 1610. This way, except for RU 1603, the rest of the radio processing and core network processing can be completely isolated for each PLMN.

Figure 17:
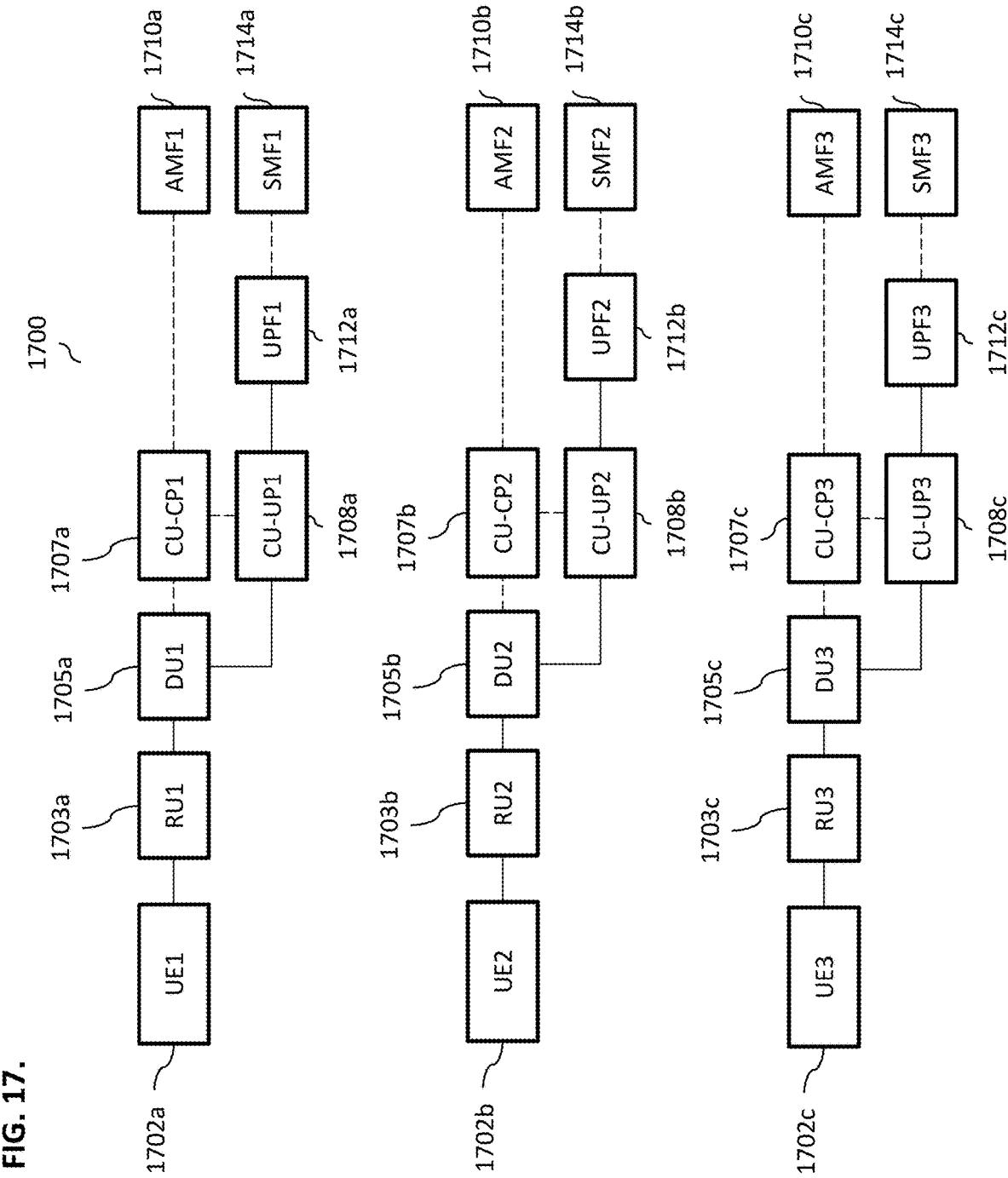
FIG. 17 illustrates an exemplary multi-operator communication system for performing resource isolation sharing in a multi-operator network, according to some implementations of the current subject matter.

FIG. 17 illustrates an exemplary multi-operator communication system 1700 for performing resource isolation sharing in a multi-operator network, according to some implementations of the current subject matter. The system 1700 can be similar to the system 1000 shown in FIG. 10 and can be implemented in a MORAN network.

As shown in FIG. 17, each PLMN can be mapped to a different component carrier. Different RUs can be placed in each cell site with one RU radiating one component carrier. Depending on the PLMN a particular UE is configured to use, it is configured to use the respective component carrier. The DU, CU-CP and CU-UP instances of different PLMNs can be hosted on the same COTS server, thereby also allowing infrastructure sharing. In particular, as illustrated in FIG. 17, the system 1700 can include one or more PLMN-specific user equipments 1702 (a, b, c), one or more remote radio units RU1-3 1703 (a, b, c), one or more distributed units DU1-3 1705 (a, b, c), one or more control plane portions CU-CP1-3 1707 (a, b, c) of the centralized unit, one or more user plane portions CU-UP1-3 1708 (a, b, c), one or more UPF1-3 1712 (a, b, c), one or more SMF1-3 1714 (a, b, c), and one or more AMF1-3 1710 (a, b, c). Each PLMN can be identified by the designations a, b, or c. In this implementations, no units are common to any of the three PLMNs.

Similar to the discussion of FIGS. 8a-10, as shown in FIGS. 15a-17, remote units (RUs 1503, 1603, 1703) can be connected to and controlled by distributed units (e.g., DUs 1505, 1605, 1705). Each DU can configure at least one of a different component carrier, band sector, subframe, slot in the remote unit, etc. and can also configure RUs for different user equipment IDs, whereby, depending on slot/subframe an I/Q sample has been received, RUs can send that sample to specific DUs.

Further, similar to the network slice isolation discussed above with regard to FIGS. 8a-11, the systems shown in FIGS. 15a-17 can be configured to flexibly configure a base station (e.g., gNB) to accommodate various desired isolation levels for the purposes of network resource sharing across different PLMNs. Specifically, one level of isolation (e.g., $1^{st}$ level of isolation) can occur from CU-UP onward, where RUs and DUs can be shared with other PLMNs. In the DU, all physical (PHY) layer, MAC and RLC configurations and resources can be shared with other PLMNs. This is illustrated by the system 1500 shown in FIG. 15a.

Another level of isolation (e.g., $2^{nd}$ level of isolation) can occur from CU-UP onward in the processing pipeline with shared RU and DU, but in the DU, each PLMN can have a specific physical layer, MAC, RLC and PDCP configurations. For example, each PLMN can be mapped to a specific component carrier and/or a specific cell defining synchronization signal block (SSB) within the same component carrier or a specific BWP within the DU. This level of isolation can be similar to the system 1500 shown in FIG.

15a but with multiple component carrier/cell defining SSB/BWP configurations within same DU.

Yet another level of isolation (e.g., $3^{rd}$ level of isolation) can occur from the DU onwards with each PLMN mapping to a different DU (e.g., as shown in FIG. 16). Lastly, yet another level of isolation (e.g., $4^{th}$ level of isolation) can include isolation at RU onward in the processing pipeline. This level isolation can be implemented in the MORAN network. In this case, a complete end-to-end isolation of user plane traffic can occur. Each RU can support a separate component carrier, as shown in FIG. 17.

Figure 18:
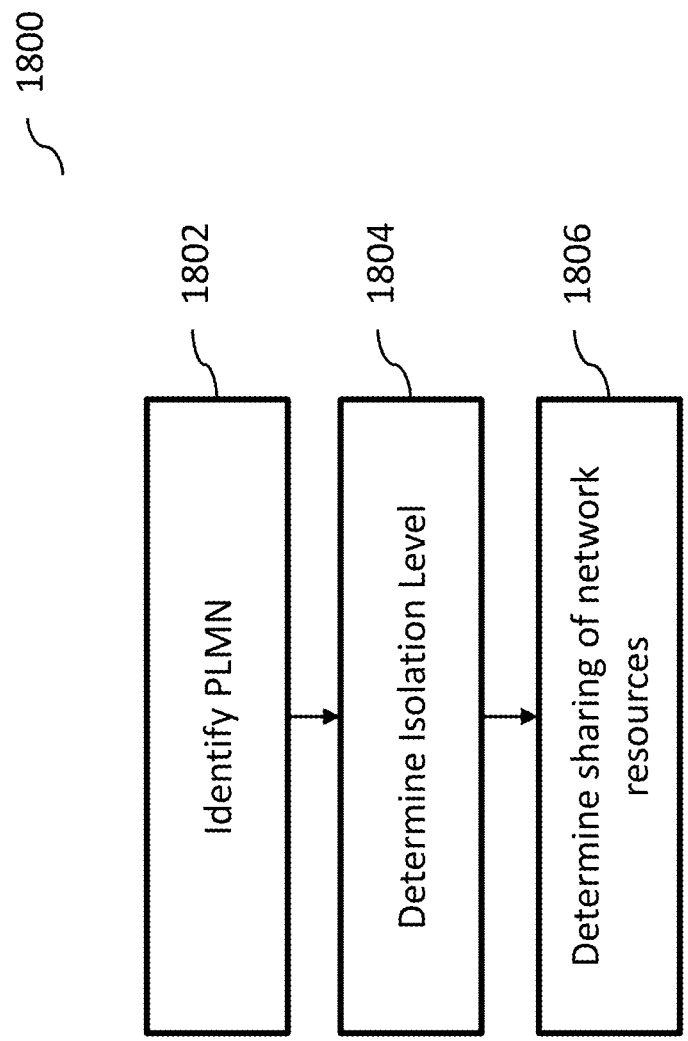
FIG. 18 illustrates an exemplary method for isolating one or more PLMN resources to a particular deployment option discussed with respect to FIGS. 15a-17, according to some implementations of the current subject matter.

FIG. 18 illustrates an exemplary method 1800 for isolating one or more PLMN resources to a particular deployment option discussed with respect to FIGS. 15a-17, according to some implementations of the current subject matter. At 1802, a particular public land mobile network can be identified. Once the PLMN is determined, a level of isolation (e.g., levels 1-4 discussed above) can also be determined, at 1804. The combination of the PLMN identification and the level of isolation can be used to determine how particular network resources can be shared (e.g., deployment option discussed in connection with FIGS. 15a-17), at 1806.

Figure 19:
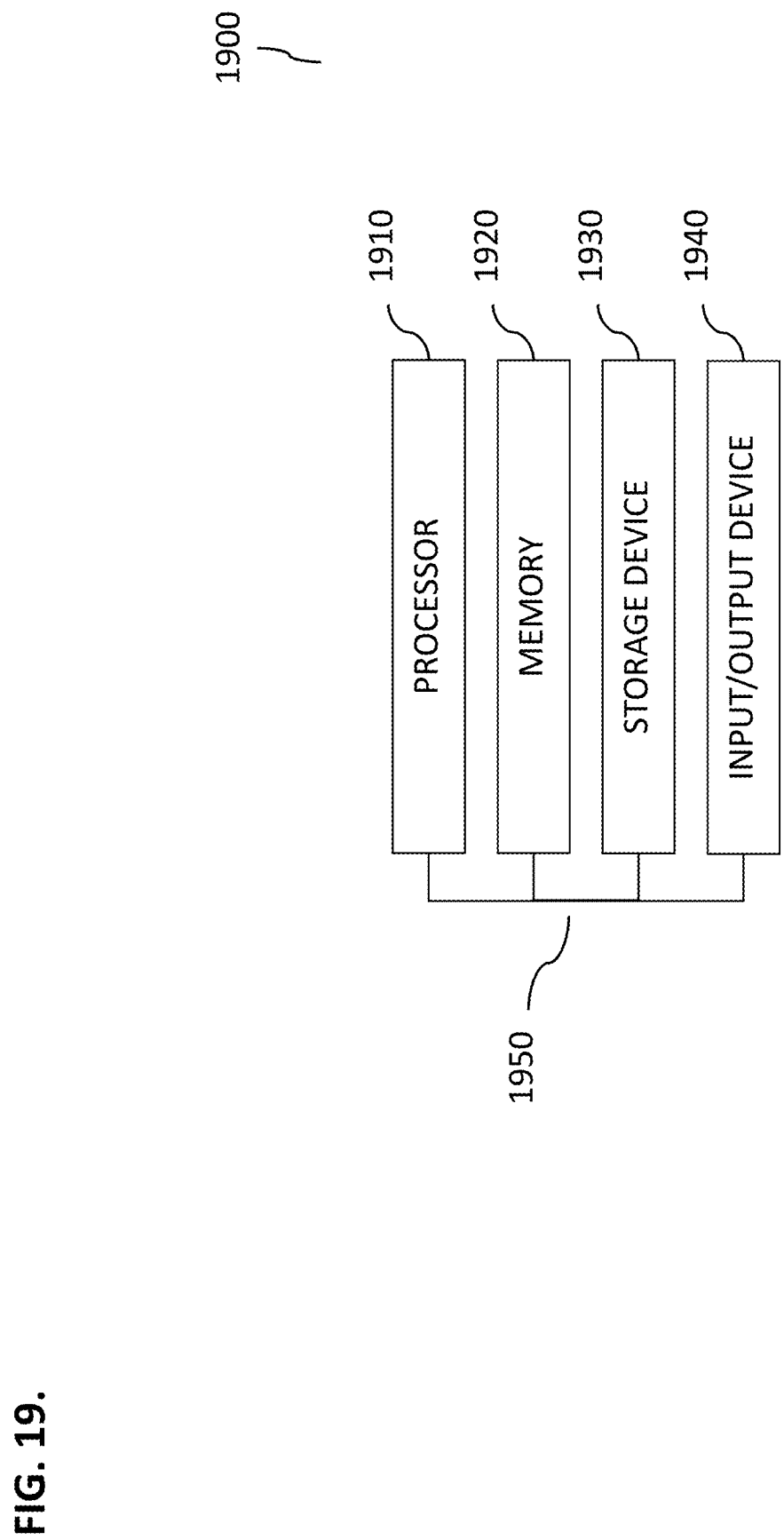
FIG. 19 illustrates an exemplary system, according to some implementations of the current subject matter.

In some implementations, the current subject matter can be configured to be implemented in a system 1900, as shown in FIG. 19. The system 1900 can include one or more of a processor 1910, a memory 1920, a storage device 1930, and an input/output device 1940. Each of the components 1910, 1920, 1930 and 1940 can be interconnected using a system bus 1950. The processor 1910 can be configured to process instructions for execution within the system 600. In some implementations, the processor 1910 can be a single-threaded processor. In alternate implementations, the processor 1910 can be a multi-threaded processor. The processor 1910 can be further configured to process instructions stored in the memory 1920 or on the storage device 1930, including receiving or sending information through the input/output device 1940. The memory 1920 can store information within the system 1900. In some implementations, the memory 1920 can be a computer-readable medium. In alternate implementations, the memory 1920 can be a volatile memory unit. In yet some implementations, the memory 1920 can be a non-volatile memory unit. The storage device 1930 can be capable of providing mass storage for the system 1900. In some implementations, the storage device 1930 can be a computer-readable medium. In alternate implementations, the storage device 1930 can be a floppy disk device, a hard disk device, an optical disk device, a tape device, non-volatile solid state memory, or any other type of storage device. The input/output device 1940 can be configured to provide input/output operations for the system 1900. In some implementations, the input/output device 1940 can include a keyboard and/or pointing device. In alternate implementations, the input/output device 1940 can include a display unit for displaying graphical user interfaces.

Figure 20:
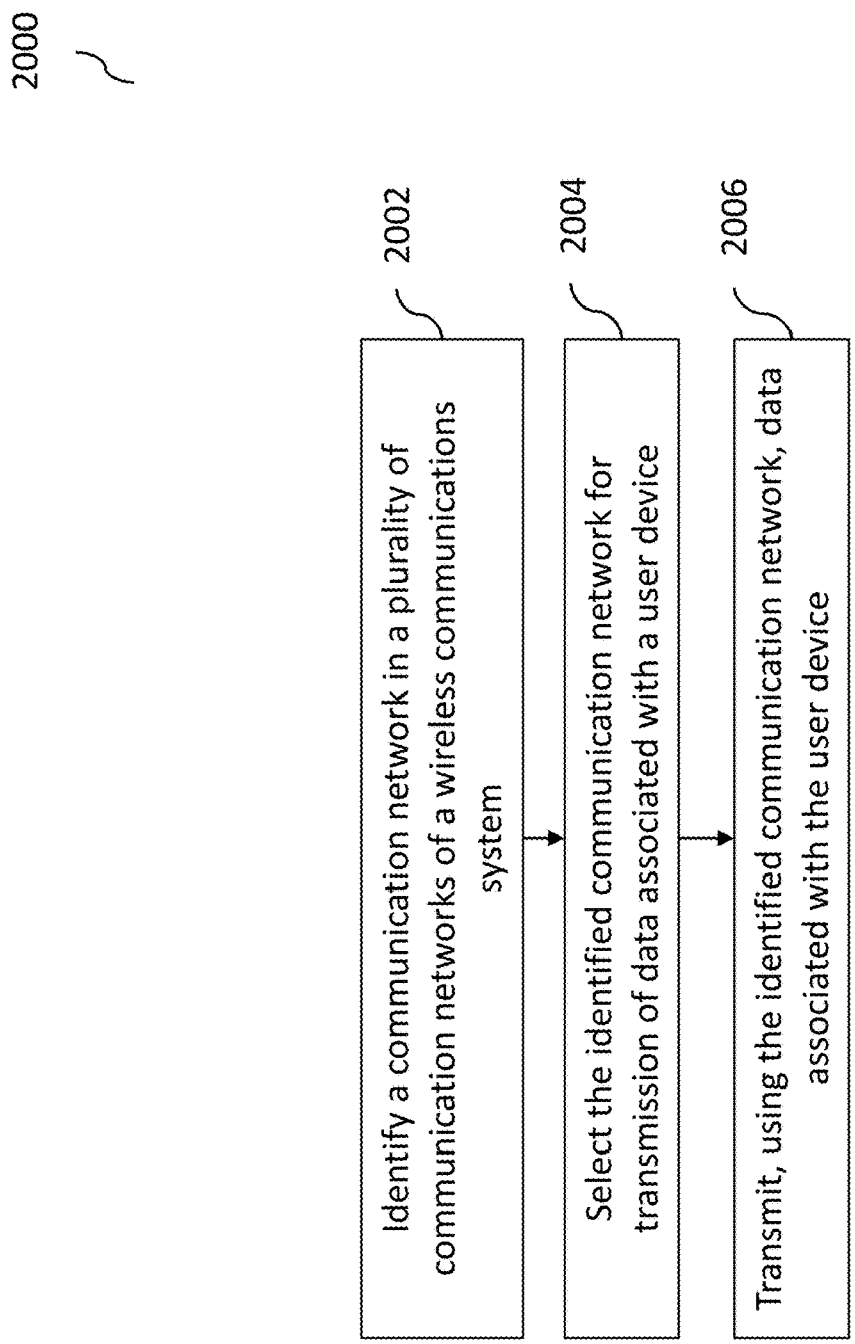
FIG. 20 illustrates an exemplary method, according to some implementations of the current subject matter.

FIG. 20 illustrates an exemplary method 2000, according to some implementations of the current subject matter. At 2002, one or more communications networks (e.g., public land mobile networks (PLMNs)) operating in a wireless communications system can be identified. Each communications network in the plurality of communications networks can have one or more communication components (e.g., RU, DU, CU-CP, CU-UP, AMF, UPF, SMF, etc.) logically isolated from one or more communication components of another communications network in the plurality of communications networks (e.g., as shown in FIGS. 15a-17).

At 2004, based on the identified communications network, that communications network in the plurality of communications networks can be selected for transmission of data associated with the user device. At 2006, using the selected communications network, data associated with the user device can be transmitted.

In some implementations, the current subject matter can include one or more of the following optional features. The method can further include determining, based on the identified communication network, at least one communication component of the communication network for isolation. In some implementations, the plurality of communications networks can include at least one of the following: a multi-operator radio access network (MORAN), a multi-operator core network (MOCN), a radio access network, a virtual radio access network, a core network, and any combination thereof. Further, the method can include selecting one or more distributed units (DU) for transmission of data based on at least one of the following: one or more component carriers, one or more bandwidth parts, one or more physical resource block ranges, and any combination thereof.

In some implementations, at least one of the identifying, the selecting and the transmitting can be performed by a base station. The base station can include at least one of the following communication components: one or more remote radio units (RUs), one or more centralized units (CUs), one or more distributed units (DUs), one or more control plane portions of the one or more centralized units (CU-CPs), one or more user plane portions of the one or more centralized units (CU-UPs), one or more access and mobility functions (AMFs), one or more user plane functions (UPFs), and one or more session management functions (SMFs). In some implementations, at least one of one or more CU-UPs, one or more AMFs, one or more UPFs, and one or more SMFs of one communication network in the plurality of communication networks are logically isolated from at least one of one or more CU-UPs, one or more AMFs, one or more UPFs, and one or more SMFs of another communication network in the plurality of communication networks. One or more remote RUs, one or more DUs, and one or more CU-CPs can be common to all communication networks in the plurality of communication networks. This is similar to the system shown in FIG. 15a. The data associated with the user device can then be transmitted using one or more communication networks.

In some implementations, the DUs, CU-UPs, AMFs, UPFs, and SMFs of different PLMNs can be logically isolated of all communication networks in the plurality of communication networks for transmission of data associated with the user device. This is similar to the system 1600 shown in FIG. 16.

In some implementations, the RUs, DUs, CU-UPs, CU-CPs, AMFs, UPFs, SMFs of different PLMNs can be logically isolated of all communication networks in the plurality of communication networks for transmission of data associated with the user device. This is similar to the system 1700 shown in FIG. 17.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    identifying a communication network in a plurality of communication networks of a wireless communications system, each communication network in the plurality of communication networks having one or more communication components logically isolated from one or more communication components of another communication network in the plurality of communication networks;
    selecting the identified communication network for transmission of data associated with a user device; and
    transmitting, using the identified communication network, data associated with the user device;

wherein at least one of the identifying, the selecting and the transmitting is performed by a base station;

the base station includes at least one of the following communication components: one or more remote radio units, one or more centralized units, one or more distributed units, one or more control plane portions of the one or more centralized units, and one or more user plane portions of the one or more centralized units;

a core network includes one or more access and mobility functions, one or more user plane functions, and one or more session management functions;

at least one of the one or more user plane portions of the one or more centralized units, the one or more access and mobility functions, the one or more user plane functions, and the one or more session management functions of one communication network in the plurality of communication networks are logically isolated from at least one of one or more user plane portions of the one or more centralized units, one or more access and mobility functions, one or more user plane functions, and one or more session management functions of another communication network in the plurality of communication networks;

one or more remote radio units, one or more distributed units, and one or more control plane portions of the one or more centralized units are common to all communication networks in the plurality of communication networks; and the transmitting includes transmitting, using one or more communication networks, data associated with the user device.

2. The method according to claim 1, further comprising determining, based on the identified communication network, at least one communication component of the communication network for isolation.

3. The method according to claim 1, wherein the plurality of communications networks include at least one of the following: a multi-operator radio access network, the core network including multi-operator core network, a radio access network, a virtual radio access network, the core network, and any combination thereof.

4. The method according to claim 3, further comprising selecting one or more of the one or more, distributed units for transmission of data based on at least one of the following: one or more component carriers, one or more bandwidth parts, one or more physical resource block ranges, and any combination thereof.

5. An apparatus comprising:
at least one programmable processor; and
a non-transitory machine-readable medium storing instructions that, when executed by the at least one programmable processor, cause the at least one programmable processor to perform operations comprising the method of claim 1.

6. The apparatus according to claim 5, wherein the operations further comprise determining, based on the identified communication network, at least one communication component of the communication network for isolation.

7. The apparatus according to claim 5, wherein the plurality of communications networks include at least one of the following: a multi-operator radio access network, the core network including a multi-operator core network, a radio access network, a virtual radio access network, the core network, and any combination thereof.

8. The apparatus according to claim 7, wherein the operations further comprise selecting one or more of the one or more distributed units for transmission of data based on at least one of the following: one or more component carriers, one or more bandwidth parts, one or more physical resource block ranges, and any combination thereof.

9. The apparatus according to claim 5, wherein the operations further comprise selecting one or more of the one or more distributed units for transmission of data based on at least a DU port ID parameter.

10. A computer program product comprising a non-transitory machine-readable medium storing instructions that, when executed by at least one programmable processor, cause the at least one programmable processor to perform operations comprising the method of claim 1.

11. The computer program product according to claim 10, wherein the operations further comprise determining, based on the identified communication network, at least one communication component of the communication network for isolation.

12. The computer program product according to claim 10, wherein the plurality of communications networks include at least one of the following: a multi-operator radio access network, the core network including a multi-operator core network, a radio access network, a virtual radio access network, the core network, and any combination thereof.

13. The computer program product according to claim 12, wherein the operations further comprise selecting one or more of the one or more distributed units for transmission of data based on at least one of the following: one or more component carriers, one or more bandwidth parts, one or more physical resource block ranges, and any combination thereof.

14. The method according to claim 1, further comprising selecting one or more of the one or more distributed units for transmission of data based on at least a DU port ID parameter.

15. A computer-implemented method comprising:
identifying a communication network in a plurality of communication networks of a wireless communications system, each communication network in the plurality of communication networks one or more communication components logically isolated from one or more communication components of another communication network in the plurality of communication networks;

selecting the identified communication network for transmission of data associated with a user device; and transmitting, using the identified communication network, data associated with the user device;

wherein at least one of the identifying, the selecting and the transmitting is performed by a base station;

the base station includes at least one of the following communication components: one or more remote radio units, one or more centralized units, one or more distributed units, one or more control plane portions of the one or more centralized units, and one or more user plane portions of the one or more centralized units;

a core network includes one or more access and mobility functions, one or more user plane functions and one or more session management functions;

at least one of the one or more distributed units, the one or more user plane portions of the one or more centralized units, the one or more access and mobility functions, the one or more user plane functions, and the one or more session management functions of one communication network in the plurality of communication networks are logically isolated from at least one of one or more distributed units, one or more user plane portions of the one or more centralized units, one or more access and mobility functions, one or more user plane functions, and one or more session management functions another communication network in the plurality of communication networks;

one or more control plane portions of the one or more centralized units, and one or more remote radio units are common to all communication networks in the plurality of communication network; and the transmitting includes transmitting, using one or more communication networks, data associated with the user device.

16. An apparatus comprising:
at least one programmable processor; and
a non-transitory machine-readable medium storing instructions that, when executed by the at least one programmable processor, cause the at least one programmable processor to perform operations comprising the method of claim 15.

17. A computer program product comprising a non-transitory machine-readable medium storing instructions that, when executed by at least one programmable processor, cause the at least one programmable processor to perform operations comprising the method of claim 15.

18. A computer-implemented method comprising:
identifying a communication network in a plurality of communication networks of a wireless communications system, each communication network in the plurality of communication networks having one or more communication components logically isolated from one or more communication components of another communication network in the plurality of communication networks;

selecting the identified communication network for transmission of data associated with a user device; and transmitting, using the identified communication network, data associated with the user device;

wherein at least one of the identifying, the selecting and the transmitting is performed by a base station;

the base station includes at least one of the following communication components: one or more remote radio units, one or more centralized units, one or more distributed units, one or more control plane portions of the one or more centralized units, and one or more user plane portions of the one or more centralized units;

a core network includes one or more access and mobility functions, one or more user plane functions, and one or more session management functions;

at least one of the one or more remote radio units, the one or more distributed units, the one or more control plane portions of the one or more centralized units, the one or more user plane portions of the one or more centralized units, the one or more access and mobility functions, the one or more user plane functions, and the one or more session management functions of one communication network in the plurality of communication networks are logically isolated from at least one of one or more remote radio units, one or more distributed units, one or more control plane portions of the one or more centralized units, one or more user plane portions of the one or more centralized units, one or more access and mobility functions, one or more user plane functions, and one or more session management functions of another communication network in the plurality of communication networks; and the transmitting includes transmitting, using one or more communication networks, data associated with the user device.

19. An apparatus comprising:
at least one programmable processor; and
a non-transitory machine-readable medium storing instructions that, when executed by the at least one programmable processor, cause the at least one programmable processor to perform operations comprising the method of claim 18.

20. A computer program product comprising a non-transitory machine-readable medium storing instructions that, when executed by at least one programmable processor, cause the at least one programmable processor to perform operations comprising the method of claim 18.

* * * * *